United States Patent
Kim et al.

(10) Patent No.: US 10,826,815 B2
(45) Date of Patent: Nov. 3, 2020

(54) VERIFICATION OF ACCESS CONTROL LIST RULES PROVIDED WITH A MESSAGE

(71) Applicant: Barefoot Networks, Inc., Santa Clara, CA (US)

(72) Inventors: Changhoon Kim, Palo Alto, CA (US); Jeongkeun Lee, Mountain View, CA (US); Milad Sharif, Mountain View, CA (US); Robert Soule, San Carlos, CA (US)

(73) Assignee: Barefoot Networks, Inc., Santa Clara, CA (US)

( * ) Notice: Subject to any disclaimer, the term of this patent is extended or adjusted under 35 U.S.C. 154(b) by 0 days.

(21) Appl. No.: 15/948,990

(22) Filed: Apr. 9, 2018

(65) Prior Publication Data
US 2019/0182154 A1    Jun. 13, 2019

Related U.S. Application Data

(60) Provisional application No. 62/483,431, filed on Apr. 9, 2017, provisional application No. 62/640,559, filed
(Continued)

(51) Int. Cl.
*H04L 12/751* (2013.01)
*H04L 12/721* (2013.01)
(Continued)

(52) U.S. Cl.
CPC .......... *H04L 45/02* (2013.01); *H04L 41/0668* (2013.01); *H04L 41/0806* (2013.01);
(Continued)

(58) Field of Classification Search
CPC ......... H04L 45/02; H04L 43/10; H04L 69/22; H04L 45/60; H04L 45/34; H04L 41/12;
(Continued)

(56) References Cited

U.S. PATENT DOCUMENTS

| 7,471,669 B1 | 12/2008 | Sabesan et al. |
| 7,639,705 B2 | 12/2009 | Watanabe et al. |

(Continued)

FOREIGN PATENT DOCUMENTS

| EP | 1320224 A1 | 6/2003 |
| WO | 2019173406 A1 | 9/2019 |

OTHER PUBLICATIONS

Andersen, David G., et al., "Accountable Internet Protocol (AIP)," SIGCOMM'08, Aug. 17-22, 2008, 12 pages, ACM, Seattle, Washington, USA.
(Continued)

*Primary Examiner* — Mounir Moutaouakil
(74) *Attorney, Agent, or Firm* — Compass IP Law PC

(57) ABSTRACT

Some embodiments provide a method for a forwarding element (FE) operating in a network of FEs. The method receives a data message with an access control list (ACL) rule and a first digest for the ACL rule appended to the data message. The ACL rule specifies that the packet is allowed to be sent through the network. The method verifies the ACL rule by computing a second digest from the ACL rule using a secret key and comparing the first digest to the second digest. The method determines whether the packet matches the ACL rule by comparing values in headers of the data message to values specified in the ACL rule. The method only forwards the data message if the ACL rule is verified and the packet matches the ACL rule.

20 Claims, 20 Drawing Sheets

Related U.S. Application Data on Mar. 8, 2018, provisional application No. 62/646,341, filed on Mar. 21, 2018.

(51) Int. Cl.

| | | |
|---|---|---|
| *H04L 12/24* | (2006.01) | |
| *H04L 12/741* | (2013.01) | |
| *H04L 12/26* | (2006.01) | |
| *H04L 29/06* | (2006.01) | |
| *H04L 12/773* | (2013.01) | |
| *H04L 9/06* | (2006.01) | |

(52) U.S. Cl.
CPC .............. *H04L 41/12* (2013.01); *H04L 43/10* (2013.01); *H04L 45/26* (2013.01); *H04L 45/32* (2013.01); *H04L 45/34* (2013.01); *H04L 45/38* (2013.01); *H04L 45/60* (2013.01); *H04L 45/72* (2013.01); *H04L 45/74* (2013.01); *H04L 45/745* (2013.01); *H04L 63/062* (2013.01); *H04L 63/101* (2013.01); *H04L 69/22* (2013.01); *H04L 9/0643* (2013.01)

(58) Field of Classification Search
CPC . H04L 41/0806; H04L 63/101; H04L 63/062; H04L 45/74; H04L 41/0668; H04L 45/32; H04L 45/745; H04L 45/26; H04L 45/72; H04L 45/38; H04L 9/0643
See application file for complete search history.

(56) References Cited

U.S. PATENT DOCUMENTS

| | | | |
|---|---|---|---|
| 7,852,771 B2 | 12/2010 | Ashwood-Smith | |
| 8,619,546 B2 | 12/2013 | Nandagopal et al. | |
| 9,948,518 B2 | 4/2018 | Kamath et al. | |
| 2003/0061479 A1* | 3/2003 | Kimura | H04L 63/06 713/153 |
| 2003/0133576 A1* | 7/2003 | Grumiaux | H04L 9/0833 380/279 |
| 2005/0041590 A1 | 2/2005 | Olakangil et al. | |
| 2005/0089016 A1* | 4/2005 | Zhang | H04L 63/0428 |
| 2005/0160095 A1* | 7/2005 | Dick | H04L 63/0428 |
| 2006/0013210 A1 | 1/2006 | Bordogna et al. | |
| 2007/0091911 A1 | 4/2007 | Watanabe et al. | |
| 2008/0132206 A1* | 6/2008 | Suzuki | H04L 63/0823 455/411 |
| 2010/0061272 A1* | 3/2010 | Veillette | H04L 45/34 370/254 |
| 2011/0055277 A1* | 3/2011 | Resch | G06F 11/1004 707/785 |
| 2012/0144014 A1 | 6/2012 | Natham et al. | |
| 2012/0215932 A1* | 8/2012 | Shemesh | H04L 9/0866 709/230 |
| 2013/0142039 A1* | 6/2013 | Bloch | H04L 45/7457 370/230 |
| 2014/0241345 A1 | 8/2014 | DeCusatis et al. | |
| 2015/0334043 A1 | 11/2015 | Li et al. | |
| 2016/0212096 A1* | 7/2016 | Gao | H04L 63/0236 |
| 2016/0226700 A1 | 8/2016 | Zhang et al. | |
| 2016/0248686 A1* | 8/2016 | Lee | H04L 47/2475 |
| 2016/0277282 A1 | 9/2016 | Chen et al. | |
| 2017/0063682 A1* | 3/2017 | Lentczner | H04L 45/74 |
| 2017/0279676 A1 | 9/2017 | Lu et al. | |
| 2018/0006945 A1 | 1/2018 | Flajslik et al. | |
| 2018/0219800 A1* | 8/2018 | Huynh | H04L 69/22 |
| 2018/0219801 A1* | 8/2018 | Tran | H04L 49/3054 |
| 2019/0182143 A1 | 6/2019 | Kim et al. | |
| 2019/0182149 A1 | 6/2019 | Kim et al. | |
| 2019/0182154 A1 | 6/2019 | Kim et al. | |
| 2019/0182367 A1 | 6/2019 | Kim et al. | |

OTHER PUBLICATIONS

Stoica, Ion, "CSFQ: Core-Stateless Fair Queueing—Technical Overview," Month Unknown 2000, 2 pages, Carnegie Mellon University, retrieved at http://www.cs.cmu.edu/~istoica/csfq/.

Elmeleegy, Khaled, et al., "EtherFuse: An Ethernet Watchdog," SIGCOMM'07, Aug. 27-21, 2007, 12 pages, ACM, Kyoto, Japan.

Godfrey, P. Brighten, et al., "Pathlet Routing," SIGCOMM'09, Aug. 17-21, 2009, 12 pages, ACM, Barcelona, Spain.

Lakshminarayanan, Karthik, et al., "Achieving Convergence-Free Routing using Failure-Carrying Packets," SIGCOMM'07, Aug. 27-31, 2007, 12 pages, ACM, Kyoto, Japan.

McCauley, James, et al., "The Deforestation of L2," SIGCOMM'16, Aug. 22-26, 2016, 14 pages, ACM, Florianopolis, Brazil.

Non-Published commonly Owned U.S. Appl. No. 15/948,946, filed Apr. 9, 2018, 26 pages, Barefoot Networks, Inc.

Non-Published commonly Owned U.S. Appl. No. 15/948,991, filed Apr. 9, 2018, 61 pages, Barefoot Networks, Inc.

Non-Published commonly Owned U.S. Appl. No. 15/948,992, filed Apr. 9, 2018, 60 pages, Barefoot Networks, Inc.

Non-Publisehd Commonly Owned International Patent Application PCT/US19/20842, filed Mar. 5, 2019, 61 pages, Barefoot Networks, Inc.

PCT International Report for Commonly Owned International Patent Application PCT/US2019/020842, dated Apr. 25, 2019, 14 pages, International Searching Authority—EPO.

First Office Action for U.S. Appl. No. 15/948,991, dated Aug. 8, 2019, 7 pages.

First Office Action for U.S. Appl. No. 15/948,992, dated May 30, 2019, 12 pages.

Jin, Xin, et al., "Your Data Center Switch is Trying Too Hard," SOSR '16: Proceedings of the Symposium on SDN Research, Mar. 14-15, 2016, 6 pages, ACM, Santa Clara, CA, USA.

Second Office Action for U.S. Appl. No. 15/948,946, dated Oct. 11, 2019, 5 pages.

Final Office Action for U.S. Appl. No. 15/948,992, dated Nov. 20, 2019, 13 pages.

\* cited by examiner

VERIFICATION OF ACCESS CONTROL LIST RULES PROVIDED WITH A MESSAGE

BACKGROUND

In a typical network, forwarding (e.g., switching/routing) is performed by the forwarding elements within the network. In a less constrained network such as the Internet, putting this functionality in the center of the network makes sense, as the devices at the edge of the network may not have the capability to make forwarding decisions and will not have knowledge of the network topology that would be required for such decisions.

FIG. 1 conceptually illustrates an example of a typical forwarding element 100 with a complex forwarding element operating system (OS) 105. As shown, the forwarding element 100 includes a packet processing board 110 with a network forwarding integrated circuit (e.g., a switch ASIC) 115 and a set of network interfaces 120. The network forwarding IC 115 handles packet processing as configured by the OS 105, and the network interfaces 120 are how packets are received/transmitted. In addition, the hardware of the forwarding element 100 includes a central processing unit (CPU) board 125 that includes a CPU (w/DRAM) 130 and various other devices 135. The forwarding element OS 105 runs on the CPU 130 and includes a kernel, an interface (e.g., a command line interface, graphical interface, etc.) that allows the switch to be programmed, a boot loader, various modules for managing the complex switching and routing functionalities of the data plane (e.g., routing protocol daemons, various APIs, etc.), as well as a data plane abstraction that enables the OS 105 to model the complex data plane and thus configure the network forwarding IC 115.

This functionality divide has also been ported to datacenters, with switches and routers (both physical and virtual) performing standard L2 switching and L3 routing. However, the operation of a datacenter would be improved by pushing the routing decisions to the edges. Doing so would require various changes to how the forwarding elements operate and to the protocols used for transmitting data packets through the network.

BRIEF SUMMARY

Some embodiments of the invention provide a hardware forwarding element without control plane logic, in a network that pushes the control plane logic to the network endpoints (e.g., virtual machines, virtualization software networking stacks, etc.). The hardware forwarding element of some embodiments includes one or more network forwarding integrated circuit (IC) for performing packet parsing and action execution (but without the match logic for performing L2 switching or L3 routing) and a minimal CPU. A forwarding element operating system (OS) runs on the CPU in order to bootstrap the network forwarding IC (e.g., to provide the IC with an initial configuration), but does not interact with the network forwarding IC during the standard course of packet processing.

This network of some embodiments includes a set of one or more network controllers, numerous forwarding elements (e.g., hardware forwarding elements as described above) that form the backbone of the network, and network endpoints. The network controllers store a stationary network topology (e.g., including the locations of all of the forwarding elements and the connections between ports of those forwarding elements), which the controllers distribute to the network endpoints when those endpoints initially come online. To send data packets through the network, the network endpoints generate packet headers that specify a path through the forwarding elements as well as, potentially, other actions for the forwarding elements to perform. The forwarding elements do not use a control plane and thus do not make decisions for data packets sent through the network. Instead, each forwarding element is configured to receive data packets, parse these packets to identify actions (forwarding or otherwise) for that forwarding element to perform, and execute these actions specified within the packet header.

The forwarding elements of some embodiments are configured to parse and process several types of packets. Data packets generated by the network endpoints include forwarding instructions as well as other actions for the forwarding elements to execute. In addition, in order to inform the network endpoints when a connection has gone down (e.g., because a port of the forwarding element is no longer operational, a port of another forwarding element or the entire other forwarding element is no longer operational, etc.), the forwarding elements generate path failure packets directed to the network endpoints. In some embodiments, upon receiving a packet that specifies for the forwarding element to send the packet out of a port towards a connection that is down, the forwarding element generates a path failure packet with the reverse path of the received packet. In addition, the forwarding elements handle bootstrapping packets from network controllers and/or network endpoints when these entities are added to the network.

When a new network endpoint is added to the network, in some embodiments this network endpoint sends a bootstrapping packet to its first-hop forwarding element (i.e., the forwarding element to which the network endpoint directly connects). The bootstrapping packets of some embodiments have a specific header that indicate themselves as such packets (as opposed to data or failover packets). When a forwarding element receives a bootstrapping packet, in some embodiments the forwarding element floods this bootstrapping packet to all of its ports (except for the port at which the packet was received). In addition, in some embodiments, the forwarding element records its ingress and egress ports in the packet header of each copy of the packet (the ingress port will be the same for each copy). Each forwarding element performs the same flood operation, until all network endpoints and the network controllers have received the bootstrapping packet (and with it the path back to the new network endpoint). In some embodiments, each forwarding element additionally checks to verify that it has not previously received that bootstrapping packet. If the forwarding element has received the packet previously, it drops that copy of the packet. When a network controller receives the bootstrapping packet, the network controller knows the path back to the new network endpoint and can therefore send that network endpoint the full stationary network topology.

For data packets sent from one network endpoint to another, in some embodiments the source network endpoint adds a packet header to the packet specifying the path through the forwarding elements. The network endpoint, in some embodiments, may be a virtual machine on which the packet originates, a hypervisor networking stack of a physical server that receives the packet from a virtual machine or container executing on that physical server, etc. In addition, in some embodiments, the network endpoints can include network gateways that exchange packets with external networks.

Each data packet sent through the network includes the inner packet (e.g., a payload, as well as traditional L2-L4 headers) as well as the packet header generated by the network endpoint that specifies the path for the packet through the network. In some embodiments, this path includes an ingress port field and egress port field for each forwarding element along the path of the packet. Using the network topology, the source endpoint determines each forwarding element along the path and fills in at least the egress port fields (and optionally, the ingress port fields as well). Each forwarding element parses the packet header, identifies its own egress port in the list of ingress and egress ports, and forwards the packet out of the specified egress port. When the ingress ports are not filled in by the source endpoint, each forwarding element that receives the packet fills in the ingress port at which it received the packet. In some embodiments, the forwarding elements determine which set of ingress and egress ports to use based on a counter in the packet header that is incremented by each forwarding element. In other embodiments, each ingress/egress port pair in the list includes a forwarding element identifier that the forwarding elements use to parse out their forwarding instructions.

Each forwarding element along the path is only aware of its own state, including whether its various connections are up. In some embodiments, when a port of a forwarding element goes down (because of a problem with the port itself, with the port of another forwarding element to which it connects, etc.), the forwarding element is configured to detect this in the data plane and store this port down status in the data plane. When the forwarding element receives a data packet specifying for the forwarding element to send a packet out of a failed port, the forwarding element generates a path failure packet and sends this packet back to the source.

The path failure packet specifies that the failed port should not be used for future packet paths (at least until the path is back up) and has a packet header that is based on the ingress and egress ports of the forwarding header of the original data packet. Specifically, using the packet header, the forwarding element with the failed port determines the path from the source endpoint to the particular forwarding element and generates a path failure packet with a header specifying the reverse path. The path failure packet header uses the ingress port at which the particular forwarding element received the data packet as its initial egress port (and the failed port as the initial "ingress" port), and then swaps the ingress ports with the egress ports for each subsequent forwarding element in reverse order from the data packet header. The egress ports (and ingress ports, if filled in by the source endpoint) of forwarding elements that were not reached by the initial data packet are dropped off from the path failure packet header.

In some embodiments, packet generation circuitry in the forwarding element generates a new packet with the path failure message and the reversed path specification, while in other embodiments the data plane constructs the path failure packet directly from the data packet. In the latter case, some embodiments remove the payload and any internal packet headers of the data packet (which are all treated by the forwarding element as unparsed payload), with the path failure packet including only the packet header for the path and a message indicating that it is a failure message.

This path failure packet traverses the reverse path, with each forwarding element parsing the packet header and forwarding the packet in the same manner as a data packet. When the network endpoint (the source of the original data packet) receives the path failure packet, this network endpoint updates its network topology. In addition, in some embodiments, the network endpoint sends a message to the network controllers to notify the controllers of the non-operational port. In other embodiments, the network endpoint is not responsible for notifying the network controllers (which do not need to be made aware of transient network changes). In such embodiments, the network controllers are made aware of the non-operational port through a slower network monitoring mechanism (e.g., by sending heartbeat messages).

In addition to forwarding instructions (i.e., ingress and egress ports), the forwarding element of some embodiments is configured to parse and execute additional types of instructions. In some embodiments, the forwarding element is configured at the time that the network forwarding IC is bootstrapped to recognize a set of action identifiers and execute corresponding actions (though some such embodiments also allow changes to this configuration during runtime). These actions can involve, in various embodiments, reading state values and embedding the state values in the packet header, generating and sending a new packet, etc.

In some embodiments, a packet header includes sets of actions specified for some or all of the forwarding elements along the path of the packet. Each action includes an action identifier and a set of zero or more arguments for the actions (e.g., ports through which to send a packet, queues for which to read the queue state, etc.). Each action corresponds to a forwarding element identifier indicating that a particular forwarding element is configured to perform that action. In some embodiments, outputting the packet to a particular port is listed as one of the actions, while in other embodiments the list of ingress and egress ports defining the packet path is separate from the list of actions for the forwarding elements to execute. Upon receiving a packet, the forwarding element of some embodiments parses the packet to identify the actions specified for that forwarding element. The forwarding element then executes these actions in the order specified within the packet header (e.g., with the actions listed sequentially).

These actions can vary in complexity in different embodiments. For example, the actions could include reading forwarding element states (e.g., queue states) and writing the state values into the packet header. Specifically, an action identifier might correspond to reading the amount of data in a queue and storing that value in the packet header, while the argument to that action would specify the particular queue to read. More complex actions could include performing congestion aware load balancing between a set of specified queues.

The ability of the forwarding elements to perform these actions and provide state data to the network endpoints enables these endpoints to use this data in determining path selection. In some embodiments, each of the network endpoints tracks the queue congestion states for each queue of all of the forwarding elements in the network and can redirect data packets to different paths if the queues for those data packets are too congested in a particular forwarding element. The network endpoints can effectively execute multipathing (e.g., ECMP) for a given forwarding element by distributing flows across several different paths leading from that forwarding element. In addition, network endpoints can act as monitoring devices by requesting data (e.g., queue state or other data) from forwarding elements and evaluating this data once received from the forwarding element.

One potential issue with providing this level of functionality to the network endpoints is that a compromised network endpoint has a lot of power over the operation of the network. In a traditional network, the forwarding elements have their own access control list (ACL) rules that can check whether packets should be discarded. However, a forwarding element that only performs actions specified by the network endpoints, rather than performing match operations, will not have such ACL rules.

If the network endpoint is completely trusted (e.g., in the case of a secure hypervisor networking stack), then this is not an issue. However, in some embodiments, to ensure that malicious endpoints cannot compromise a network, the forwarding elements verify the ACL rules using a shared secret between the network controllers and the forwarding elements (or separate shared secrets between the controllers and each of the forwarding elements).

Specifically, in some embodiments, the source network endpoint is responsible for evaluating each packet against a set of ACL rules that the network endpoint receives from the set of network controllers. The network controllers of some embodiments provide each of the network endpoints with the set of ACL rules (which may be different for different network endpoints) as well as a precomputed digest for each of the ACL rules. The precomputed digest is generated by the network controller for each ACL controller using a secret key (e.g., with a hash function) to which the network endpoints do not have access.

The source network endpoint for a packet evaluates the packet against the set of ACL rules to determine whether the packet is allowed (e.g., based on the source and/or destination addresses of the packet). When the highest priority matching ACL rule allows the packet to be sent through the network, the source network endpoint then appends this ACL rule to the packet along with the precomputed digest for the ACL rule received from the network controllers.

Upon receiving a packet, the forwarding element of some embodiments verifies both (i) that the ACL rule matches the digest and (ii) that the ACL rule is a correct ACL rule for the packet. If the ACL rule passes both of these checks, then the forwarding element continues processing the packet (e.g., forwarding the packet, performing any additional actions specified in the packet header). However, if the ACL rule fails either of the checks, then the forwarding element drops the packet in some embodiments, on the premise that the packet is either sent from a compromised network endpoint or an invalid network endpoint. Similarly, if the packet does not have an ACL rule attached, the forwarding element also drops the packet in some embodiments.

To verify that the ACL rule matches the digest, the forwarding element of some embodiments uses the secret key received from the network controller to compute a new digest from the ACL rule. In some embodiments, this computation involves applying a hash function to the ACL rule with the secret key. The forwarding element then compares the computed digest to the digest appended to the packet and verifies that they match. If the digest does not match, this indicates that the source network endpoint did not receive the ACL rule from the network controller (e.g., because the network endpoint is not a verified endpoint for the network).

To verify that the ACL rule is a correct ACL rule for the packet, the forwarding element of some embodiments checks the packet header values (e.g., IP and/or MAC addresses, etc.) that the ACL rule specifies are required for the packet against the actual header values of the packet. This does not require the use of match table logic in some embodiments, as the forwarding element simply needs to extract these values from the ACL rule and extract the corresponding values from the packet header and compare the two sets of values. Some embodiments require that the ACL rules be structured in a particular manner so that the parser or other components of the forwarding element can identify the required packet header values or ranges of values. If the packet header values do not match those required by the ACL rule, then this indicates that the source network endpoint appended an invalid ACL rule to the packet (e.g., because the source endpoint is compromised) and the packet should be dropped.

In order to prevent a compromised network endpoint from skipping over a higher priority rule denying a packet and using a lower priority rule that allows the packet (which would seem to the forwarding element as a valid and correct ACL rule), the network controllers of some embodiments flatten out the ACL rule set (ensuring there is no overlap in the rule space) before providing the ACL rules and digests to the network endpoints. In other embodiments, the ACL rule set may be overlapping, but effectively acts as a whitelist. That is, the network controller provides rules (which may overlap) for all allowable packets, and a single lower-priority rule denying all other packets.

In some embodiments, the network is arranged so that each network endpoint connects to only one of the forwarding elements of the network (though a given forwarding element may have multiple connected network endpoints). In this case, in some embodiments, each forwarding element has its own secret key known only to that forwarding element and the network controllers. The digests provided to a particular network endpoint with the ACL rules are computed using the secret key of the forwarding element to which the network endpoint connects, and this forwarding element is then responsible for verifying the ACL rules sent from that network endpoint. In some such embodiments, after verifying the ACL rule for a packet, the forwarding element forwards the packet without the ACL rule appended. In other embodiments, the same secret key is used for all of the forwarding elements. In some such embodiments, the ACL rules are verified by each forwarding element in the network, while in other such embodiments only the first-hop forwarding element verifies the ACL rules.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Some embodiments of the invention provide a hardware forwarding element (HFE) without control plane logic, in a network that pushes the control plane logic to the network endpoints (e.g., virtual machines, virtualization software networking stacks, etc.). The HFE of some embodiments includes a network forwarding integrated circuit (IC) for performing packet parsing and action execution (but without the match logic for performing L2 switching or L3 routing) and a minimal CPU. A forwarding element operating system (OS) runs on the CPU in order to bootstrap the network forwarding IC (e.g., to provide the IC with an initial configuration), but does not interact with the network forwarding IC during the standard course of packet processing.

Figure 1:
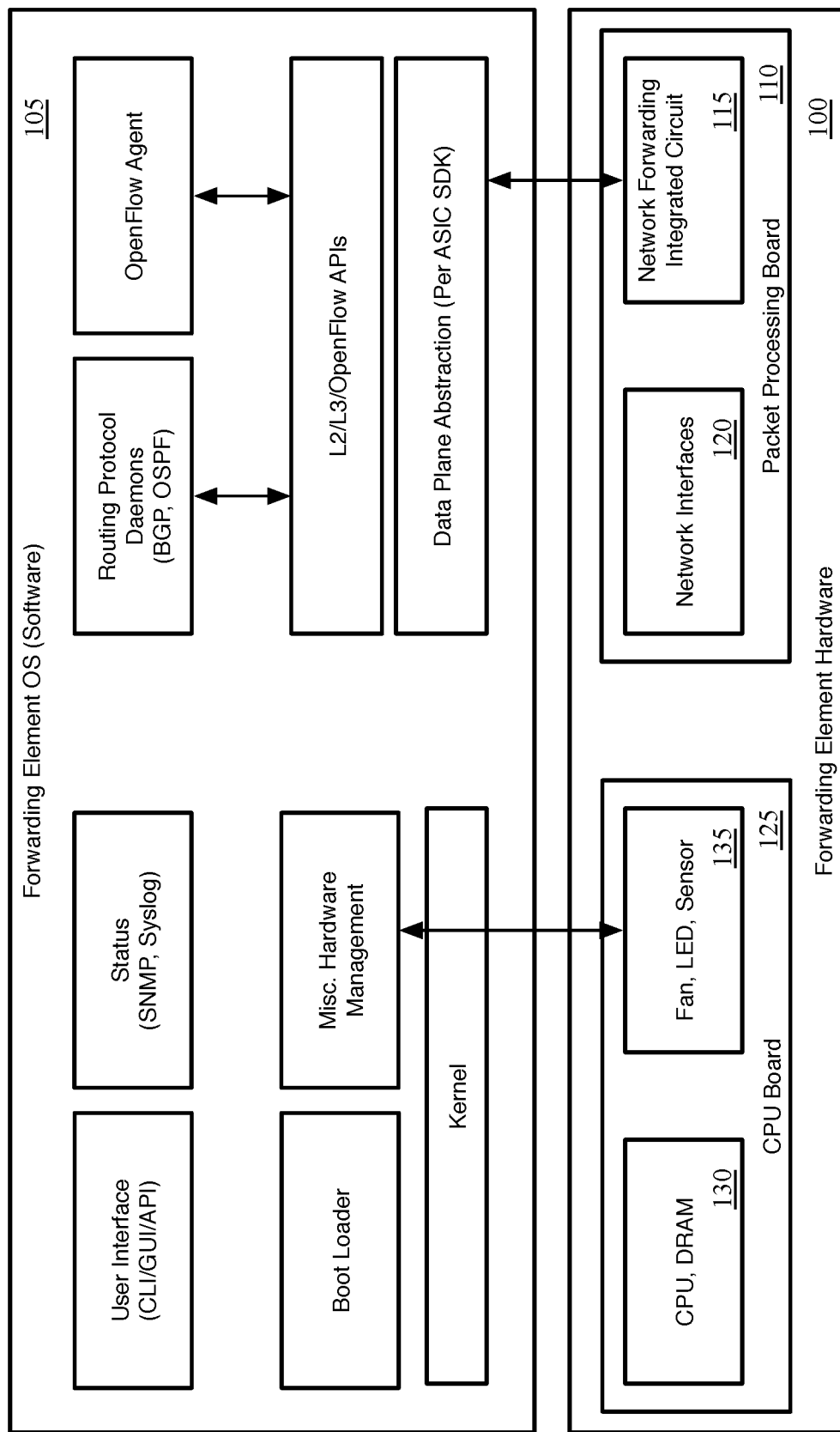
FIG. 1 conceptually illustrates an example of a typical forwarding element 100 with a complex forwarding element operating system.
Figure 2:
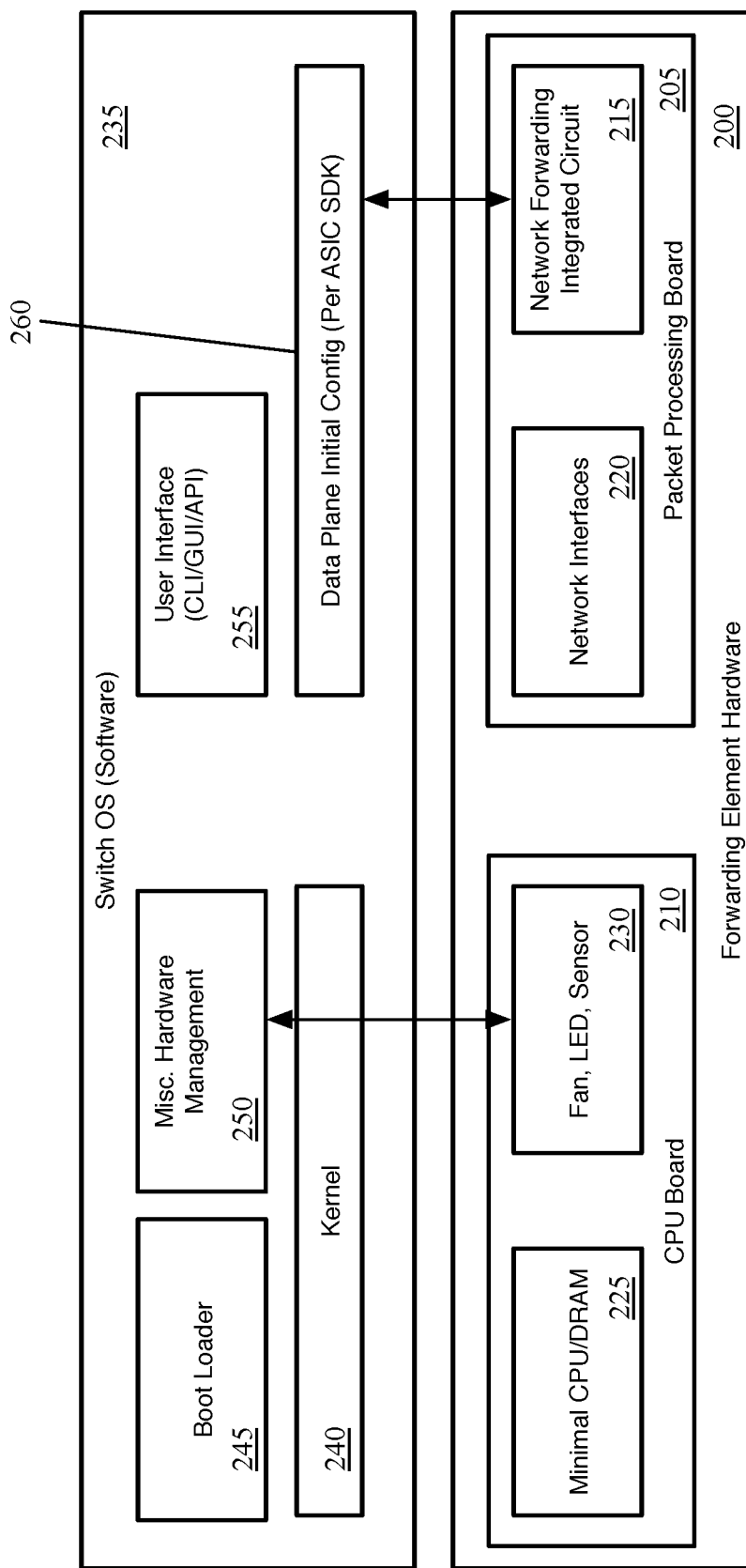
FIG. 2 conceptually illustrates an example of a hardware forwarding element of some embodiments.

FIG. 2 conceptually illustrates an example of such an HFE 200. As shown, like the HFE 100, the HFE 200 includes a packet processing board 205 and a CPU board 210. The packet processing board 205 includes a network forwarding IC 215 (or multiple such ASICs) and a set of network interfaces 220. The CPU board 210 includes a minimal CPU 225 (optionally with DRAM) as well as various other platform devices 230 (e.g., a fan, sensors, etc.).

In this case, however, the forwarding element OS 235 is far more minimal. Because the network forwarding IC 215 does not require match logic (e.g., there are no forwarding tables that select an output port based on MAC or IP addresses), there is no control plane necessary in the OS 235. The minimal OS 235 still includes a kernel 240, a boot loader 245, drivers or other management software 250 for managing the various devices 230, and a user interface 255 for receiving an initial configuration.

Rather than requiring a complete data plane abstraction that models multiple stages of match tables, the data plane initial configuration 260 is a configuration that can be loaded onto the network forwarding IC 215 when the IC 215 initially boots up and does not need to be changed during runtime. In the case of hardware forwarding element 200, after the initial bootstrapping, the network forwarding IC 205 can be essentially decoupled from the CPU and is able to operate on its own.

Figure 3:
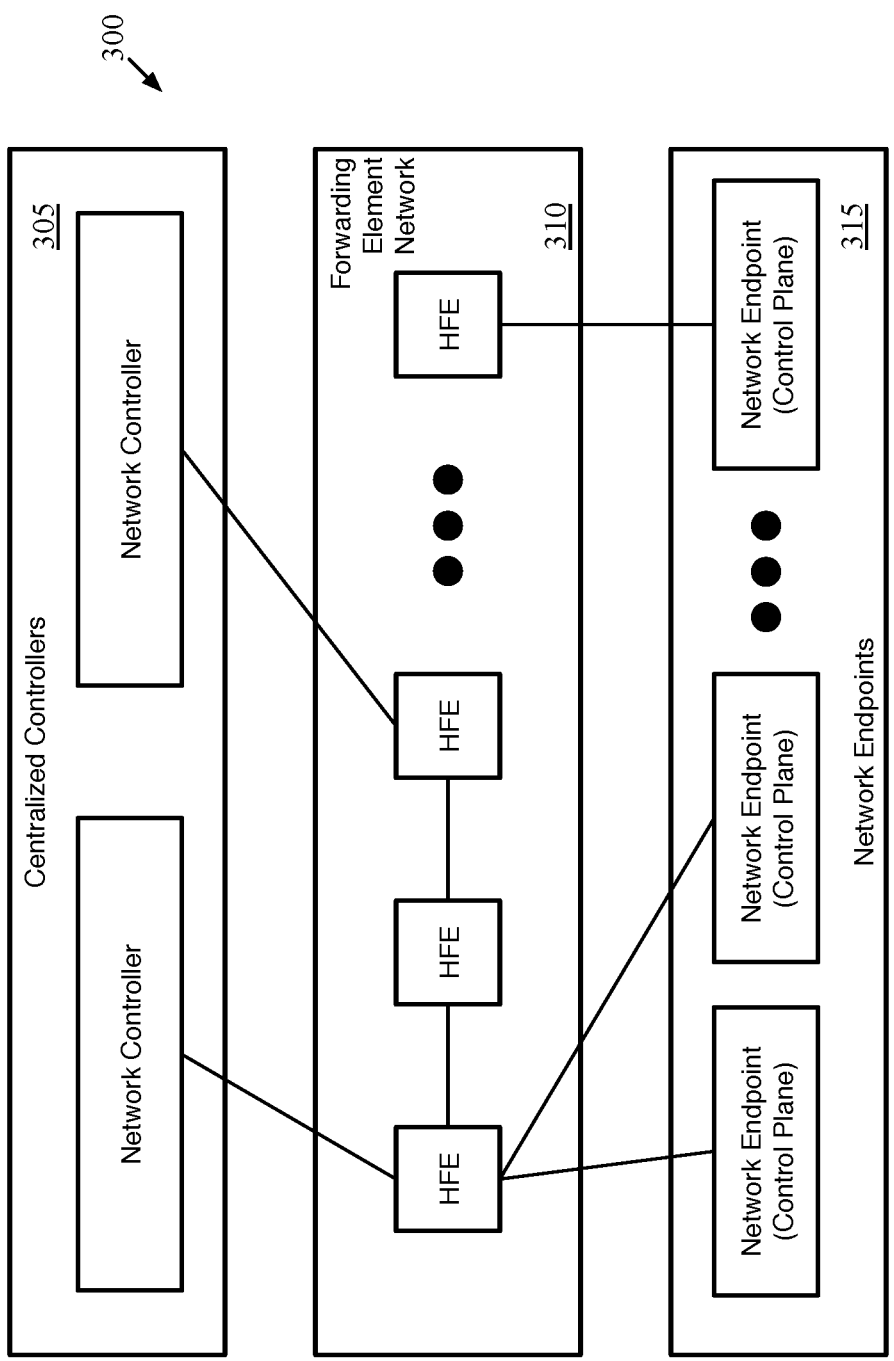
FIG. 3 conceptually illustrates a network of some embodiments that includes a set of one or more network controllers, numerous forwarding elements (FEs) that form the backbone of the network, and network endpoints.

The HFE of some embodiments operates in a network that includes a set of one or more network controllers, numerous forwarding elements (FEs) that form the backbone of the network (shown in this case as HFEs) and network endpoints. FIG. 3 conceptually illustrates such a network 300. As shown, the network 300 includes a set of centralized network controllers 305, a set of HFEs 310, and a set of network endpoints 315.

The network controllers 305 store a stationary network topology which the controllers distribute to the network endpoints 315 when those endpoints initially come online as part of an initial bootstrapping process for the endpoints. The stationary network topology, in some embodiments, includes all of the HFEs 310 in the network and the connections between the HFEs, including port identifiers for each connection between HFEs. In addition, the stationary network topology includes the network endpoints 315 and their connections to the HFEs 310 in some embodiments. The stationary network topology may include additional data, such as the capabilities of each of the HFEs, physical-to-logical port and queue mappings for the HFEs, etc. The stationary topology stored by the network controller is updated regularly as forwarding elements and/or network endpoints join and leave the network 300, but does not account for transient changes (e.g., ports and/or HFEs that go down and come back up quickly). As discussed further below, the network endpoints 315 store the transient network topology that is updated on a much faster basis than the stationary network topology.

In some embodiments, the network controllers 305 have a master controller that is responsible for storing a master copy of the stationary network topology. The master controller is also responsible for distributing the topology to new network endpoints. In some such embodiments, the master controller shares the topology state with the other (backup) network controllers, and these controllers may also help with maintaining the network state (e.g., by regularly verifying that the HFEs are present in the network). In some embodiments, each of the network controllers 305 connects to one of the forwarding elements 310.

The HFEs 310 form the backbone of the network 300, connecting the network endpoints 315 to each other and to the network controllers 305. In some embodiments, the network 300 is a contained network (e.g., within a datacenter) and there are no intervening forwarding elements that are not configured in the same (or similar) manner. In some such embodiments, a subset of the network endpoints 315 are gateways that provide connections for the network 300 to external networks (e.g., the Internet). In other embodiments, the network 300 spans multiple datacenters, and some of the HFEs 310 are configured to tunnel packets across the intervening networks between the datacenters. The HFEs 310, in some embodiments, are those described above by respect to FIG. 2, with minimal CPU and without a control plane. It should also be noted that, while HFEs are shown here and in the subsequent description (e.g., HFEs such as described by reference to FIG. 2), other forwarding elements (e.g., software forwarding elements) may perform some aspects of the invention in some embodiments.

The HFEs 310 are configured to parse and process several types of packets. Data packets generated by the network endpoints 315 include forwarding instructions as well as other actions for the HFEs to execute. In addition, in order to inform the network endpoints 315 when a connection has gone down (e.g., because a port of the HFE is no longer operational, a port of another HFE or the entire other HFE is no longer operational, etc.), the HFEs 310 generate path failure packets directed to the network endpoints. In some embodiments, upon receiving a packet that specifies for the HFE to send the packet out of a port towards a connection that is down, that HFE generates a path failure packet with the reverse path of the received packet. In addition, the HFEs handle bootstrapping packets from network controllers and/or network endpoints when these entities are added to the network.

The network endpoints 315, in some embodiments, operate the control plane (rather than having the control plane operating at the HFEs 310) and store the transient network topology. These network endpoints may be virtual machines that also execute applications that are the sources and destinations for data traffic, hypervisor networking stacks of a physical host machine (e.g., that hosts virtual machines and/or containers that are the sources and destinations for data traffic, etc.). In addition, as mentioned, in some embodiments the network endpoints include network gateways that exchange packets with external networks.

The transient network topology includes the most up-to-date changes to the actual network. Whereas the stationary network topology stored by the network controllers 305 represents the desired network state and is updated on a relatively slow scale, the transient network topology represents the most current actual network state and is updated on a much faster scale (e.g., per packet if possible). The transient network topology is based on the stationary network topology, then updated based on information from the HFEs 310 in some embodiments.

To send data packets through the network, the network endpoints 315 use the control plane to generate packet headers that specify paths through the HFEs 310 for the data packets according to the transient network topology. The packet headers, in some embodiments, can also include other actions for the HFEs 310 to perform. As mentioned, the HFEs 310 do not use a control plane and thus do not make decisions for data packets sent through the network. Instead, each HFE 310 is configured to receive data packets, parse these packets to identify actions (forwarding or otherwise) to perform, and execute these actions specified within the packet header.

As mentioned, the HFEs are configured to parse and process several types of packets, including bootstrapping packets for adding a new network endpoint. In addition, the HFEs handle bootstrapping packets from network controllers and/or network endpoints when these entities are added to the network. When a new network endpoint is added to the network, in some embodiments this network endpoint sends a bootstrapping packet to its first-hop HFE (i.e., the HFE to which the network endpoint directly connects). The bootstrapping packets of some embodiments have a specific header that indicate themselves as such packets (as opposed to data or failover packets). When an HFE receives a bootstrapping packet, in some embodiments the HFE floods this bootstrapping packet to all of its ports (except for the port at which the packet was received), or a predefined subset of its ports. In addition, in some embodiments, the HFE records its ingress and egress ports in the packet header of each copy of the packet (the ingress port will be the same for each copy). Each HFE performs the same flood operation, until all network endpoints and the network controllers have received the bootstrapping packet (and with it the path back to the new network endpoint). In some embodiments, each HFE additionally checks to verify that it has not previously received that bootstrapping packet. If the HFE has received the packet previously, it drops that copy of the packet. When a network controller receives the bootstrapping packet, the network controller knows the path back to the new network endpoint and can therefore send that network endpoint the full stationary network topology via that path. This path may also be used in order for traditional bootstrapping requests such as DHCP (with the network controllers acting as the DHCP servers for the network endpoints).

The HFEs of some embodiments are also configured to process data packets sent from one network endpoint to another by parsing the packet headers added by the network endpoint in order to determine how to forward the packets. For data packets sent from one network endpoint to another, in some embodiments the source network endpoint adds a packet header to the packet specifying the path through the forwarding elements.

Figure 4:
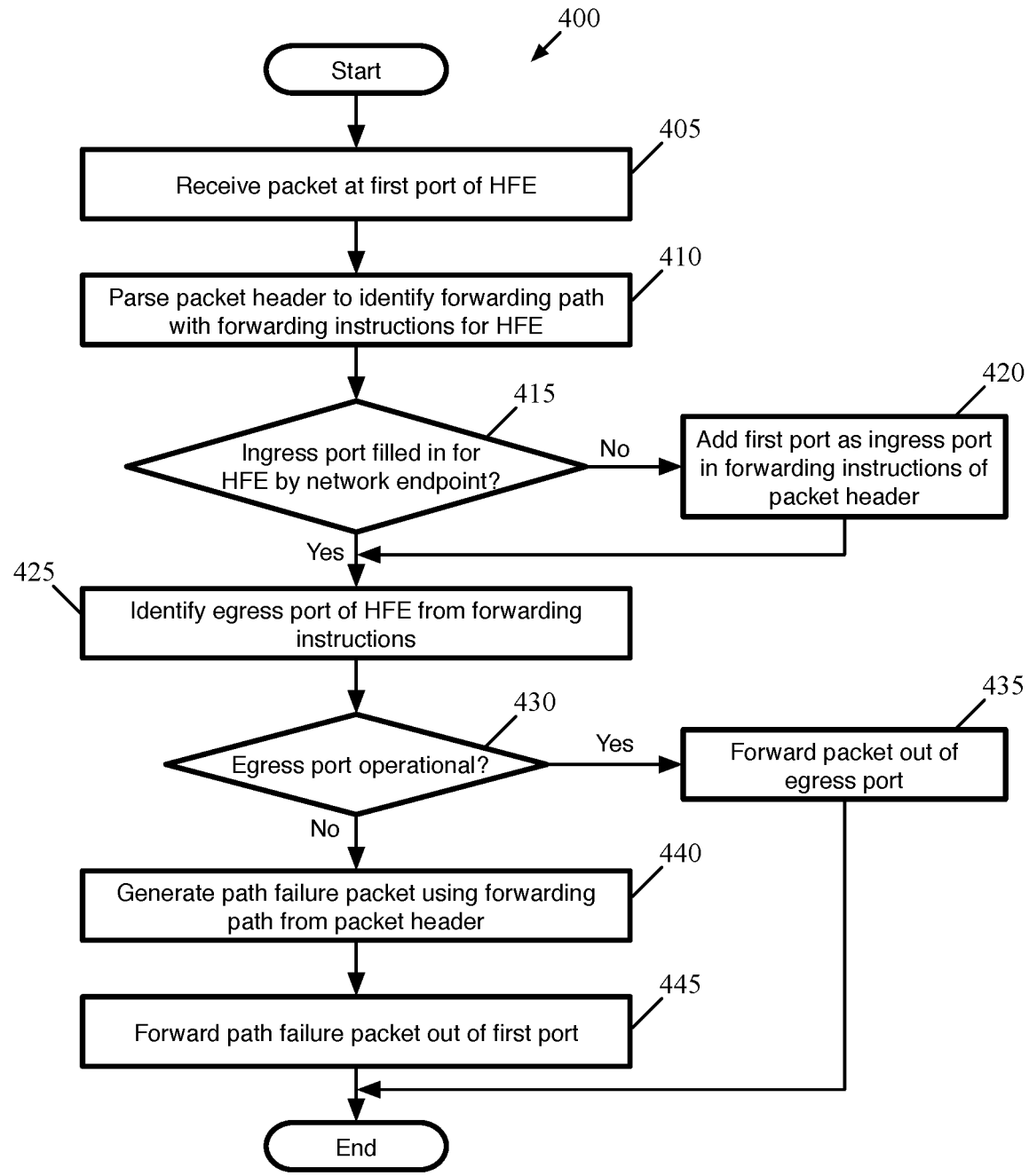
FIG. 4 conceptually illustrates a process of some embodiments performed for processing forwarding path packet headers.

FIG. 4 conceptually illustrates a process 400 of some embodiments performed for processing forwarding packet headers. The process 400 is performed by an HFE of some embodiments in order to forward a data packet received by the HFE. This process will be described in part by reference to FIGS. 5 and 6A-B, which illustrate data packet forwarding headers through a network of HFEs.

Figure 5:
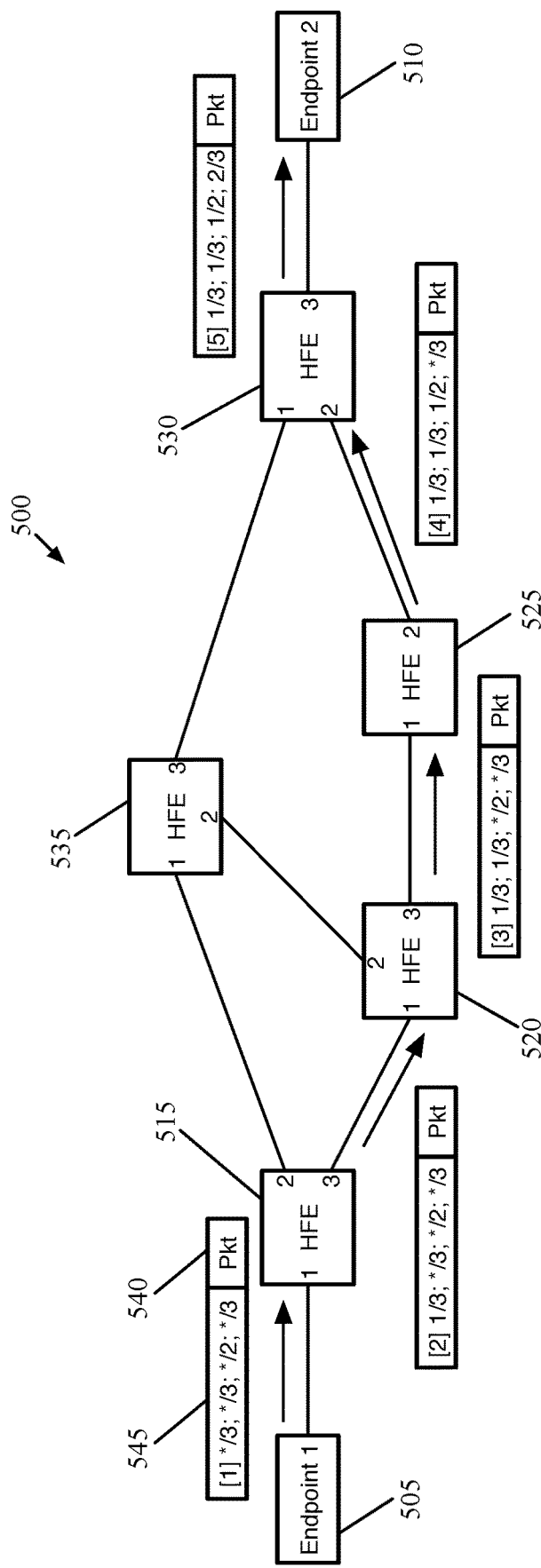
FIG. 5 conceptually illustrates a packet sent from one network endpoint to another network endpoint through a network of HFEs.

As shown, the process 400 begins by receiving (at 405) a data packet at a first port of an HFE (the ingress port for the packet). In some embodiments, each of the HFEs includes multiple ports through which packets are received and transmitted. FIG. 5 conceptually illustrates a packet sent from one network endpoint 505 to another network endpoint 510 through a network 500 of HFEs 515-535. As shown, each of the HFEs 515-535 includes at least two ports, which may connect to other HFEs or to network endpoints. These ports are numbered in the figure for each of the HFEs, and in some embodiments are represented by port identifiers. In some embodiments, HFE ports may also connect to network controllers, which are not shown in this figure.

The process 400 parses (at 410) the packet header of the packet to identify a forwarding path with forwarding instructions for the HFE. Each data packet sent through the network includes the inner packet (e.g., a payload, as well as traditional L2-L4 headers) as well as the packet header generated by the network endpoint that specifies the path for the packet through the network. In some embodiments, this path includes an ingress port field and egress port field for each forwarding element along the path of the packet. Using the network topology, the source endpoint determines each forwarding element along the path and fills in at least the egress port fields (and optionally, the ingress port fields as well). In some embodiments, the HFEs determine which set of ingress and egress ports to use based on a counter in the packet header that is incremented by each forwarding element. In other embodiments, each ingress/egress port pair in the list includes a forwarding element identifier that the forwarding elements use to parse out their forwarding instructions As shown in FIG. 5, the source network endpoint 505 of a packet 540 appends a packet header 545 to this packet that is updated by each of the HFEs 515-530 that processes the packet. The packet 540 could be, e.g., a TCP/IP packet with a payload as well as Ethernet, IP, and TCP headers, none of which the HFEs in the network 500 process. The packet header 545, as generated by the network endpoint 505, initially lists egress ports for four HFEs and a counter "[1]" that indicates which set of ingress and egress ports the next HFE should use.

Returning to FIG. 4, the process 400 next determines (at 415) whether the ingress port for the HFE was filled in by the network endpoint. As shown in FIG. 5, the packet header 545 does not include any ingress ports (e.g., just listing wildcard values) when initially generated by the network endpoint 505.

When the ingress port is not filled in, the process 400 adds (at 420) the first port (at which the packet was received) as the ingress port in the forwarding instructions of the packet header. In the example of FIG. 5, each of the HFEs 515-530 that processes the packet header 545 fills in its own ingress port. For example, the first HFE 515 receives the packet at its own port 1, so the packet header that the HFE 515 sends to the next HFE 520 has the ingress port filled in with port for the first ingress/egress port pair. Similarly, the second HFE 520 fills in the second ingress port with its own port 1, and so on for the HFEs 525 and 530. In addition, in this example, each of the HFEs increments the counter so that the next HFE will use the appropriate ingress/egress port pair.

Next, the process 400 identifies (at 425) the egress port through which to output the packet from the parsed forwarding instructions. The process determines (at 430) whether the egress port is operational. Each forwarding element along the path is only aware of its own state, including whether its various connections are currently up. In some embodiments, when a port of an HFE goes down (because of a problem with the port itself, with the port of another HFE to which it connects, etc.), the HFE is configured to detect this in the data plane and store this port down status in the data plane. In some embodiments, the HFE is configured to check the specified egress port for a packet against its stored operational state for the port (e.g., a binary value indicating whether each port is up or down).

When the egress port is operational, the process 400 forwards (at 435) the packet out of the specified egress port. In the example shown in FIG. 5, all of the ports of the HFEs shown in the figure are operational, so the packet 540 successfully traverses the network from the source network endpoint 505 through the HFEs 515-530 to the destination network endpoint 510. Once the packet arrives at the source network endpoint 510, the counter has been incremented to [5] and all of the ingress ports are filled in. In some embodiments, the destination network endpoint 510 can determine the path via which the packet was sent. However, if the port identifiers used overlap from one HFE to another and these are the only information provided in the packet header, then the destination network endpoint may not have enough information to determine the path chosen by the source network endpoint. In some embodiments, a first network endpoint may send packets to a second network endpoint using a different path than the second network endpoint uses for packets in the reverse direction.

When the egress port is not operational, the process 400 generates (at 440) a path failure packet using forwarding data from the packet header. The path failure packet of some embodiments specifies that the failed port should not be used for future packet paths (at least until the path is back up) and has a packet header that is based on the ingress and egress ports of the forwarding header of the original data packet. Specifically, using the packet header, the hardware forwarding element with the failed port determines the path from the source endpoint to the particular forwarding element and generates a path failure packet with a header specifying the reverse path. The path failure packet header uses the ingress port at which the particular forwarding element received the data packet as its initial egress port (and the failed port as the initial "ingress" port), and then swaps the ingress ports with the egress ports for each subsequent forwarding element in reverse order from the data packet header. The egress ports (and ingress ports, if filled in by the source endpoint) of forwarding elements that were not reached by the initial data packet are dropped off from the path failure packet header. The process 400 forwards (at 445) the path failure packet out of the first port (the ingress port for the received data packet), then ends.

Figure 6A:
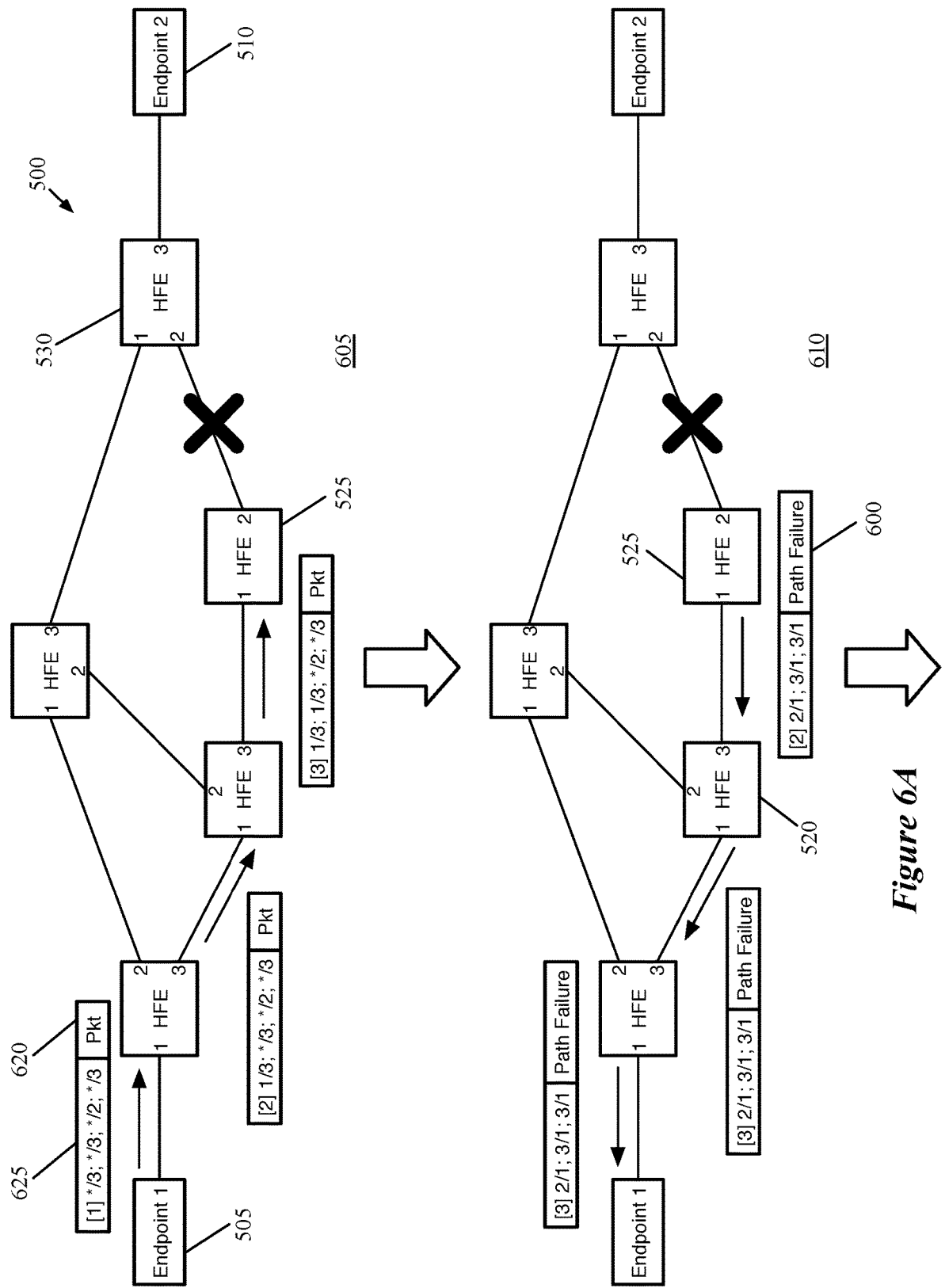
FIGS. 6A-B conceptually illustrate an example of the generation and transmission of a path failure packet in the network of FIG. 5, and subsequent adjustment by the source network endpoint.
Figure 6B:
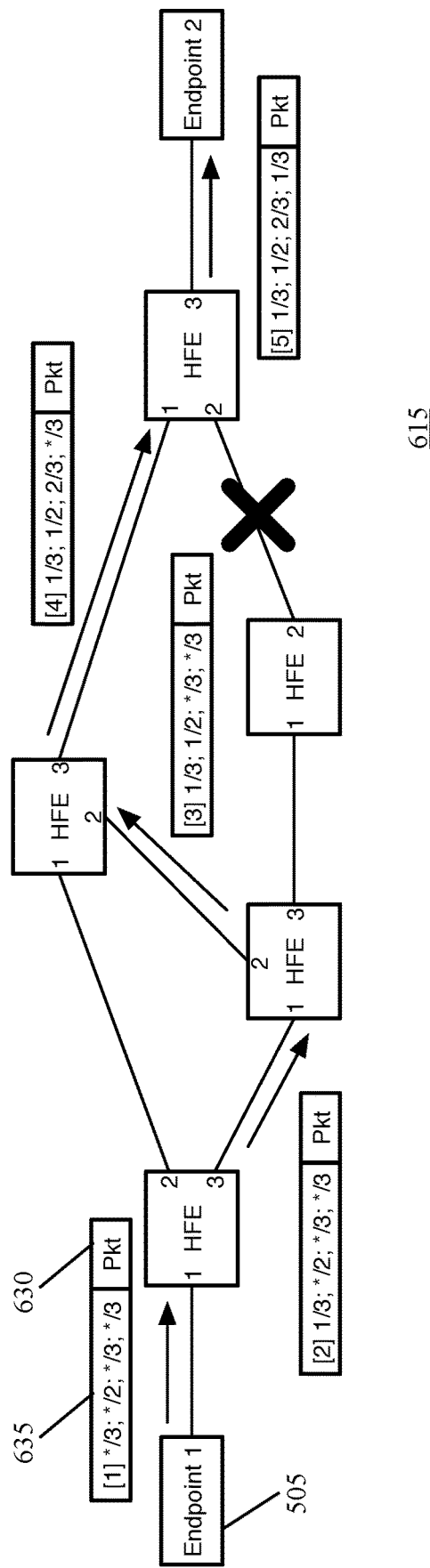

FIG. 6A-B conceptually illustrates an example of the generation and transmission of a path failure packet 600 in the network 500, and subsequent adjustment by the source network endpoint 505, over three stages 605-615. As shown in the first stage 605, the connection between the HFEs 525 and 530 is currently down, which would have been detected by the data plane of each of these HFEs. In this first stage, the network endpoint 505 sends a packet 620 directed to the network endpoint 510 with a packet header 625. The packet header 625 is the same as that from FIG. 5, and proceeds in the same manner until reaching the third HFE 525. Here, the packet header 625 specifies for the HFE 525 to send the packet out of its port 2, which is currently down.

Thus, in the second stage 610, the HFE 525 generates a path failure packet 600 with the reverse path of the packet header 625. As shown, the forwarding path in the path failure packet 600 starts with the ingress/egress ports of the HFE 525 with the ports switched from the packet header 625. Then, each of the previous ingress/egress port pairs are also switched, in reverse order from the packet header 625. In addition, the counter is set to [2] so that the HFE 520 will use the proper set of ingress/egress ports for forwarding the packet. This enables the path failure packet 600 to traverse the reverse path back to the network endpoint 505, which updates its stored network topology to remove the connection between the HFEs 525 and 530. The generation of path failure packets is described in further detail below by reference to FIG. 7.

In addition, in some embodiments, the network endpoint 505 sends a message to the network controllers to notify the controllers of the non-operational port. In other embodiments, the network endpoints are not responsible for notifying the network controllers (which do not need to be made aware of transient network changes). In such embodiments, the network controllers become aware of the non-operational port through a slower network monitoring mechanism (e.g., by sending heartbeat messages).

The third stage 615 illustrates that the network endpoint 505 sends a subsequent packet 630 to the destination network endpoint 510 using a different path, accounting for the lack of connection between the HFEs 520 and 525. The source endpoint 505 appends a packet header 635 that is similar to the packet header 625 but with a different set of egress ports so that the packet follows a different path to reach its destination. In some embodiments, bootstrapping techniques are used to notify the network controller and/or network endpoints once the connection has recovered.

Figure 7:
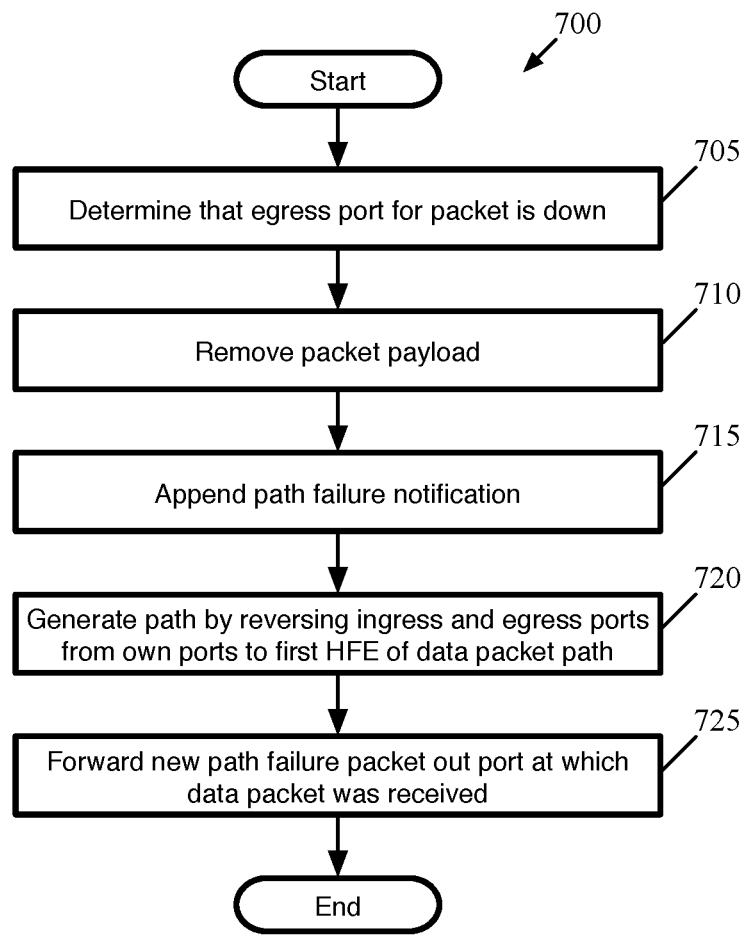
FIG. 7 conceptually illustrates a process of some embodiments for generating a path failure packet from a data packet that cannot be sent out of its specified egress port.

In some embodiments, packet generation circuitry in the hardware forwarding element generates a new packet with the path failure message and the reversed path specification, while in other embodiments the data plane constructs the path failure packet directly from the data packet. FIG. 7 conceptually illustrates a process 700 of some embodiments for generating such a path failure packet from a data packet that cannot be sent out of its specified egress port. The process 700 is performed by the data plane of an HFE in some embodiments.

As shown, the process 700 begins by determining (at 705) that the egress port for a data packet is down (e.g., the decision at 430 of the process 400). In this case, the HFE data plane generates a path failure packet. The process 700 then removes (at 710) the packet payload. The payload, as noted above, includes all of the packet headers of the internal packet (e.g., L2-L4 headers). In some other embodiments, the HFE does not remove the packet payload, and instead includes the payload in the path failure packet, which enables the source network endpoint for the original data packet to more easily identify which packet did not reach its destination (and thus resend this same data packet via a different path).

The process 700 also appends (at 715) a path failure notification to the packet header. In some embodiments, this notification specifies the HFE with the failed port as well as the specific port that failed (e.g., using HFE and port identifiers). In other embodiments, the notification appended to the packet header simply specifies that the packet is a path failure packet. In the latter case, the network endpoint can use the forwarding path to identify the HFE that generated the packet (by tracking the forwarding path through its stored topology) as well as the failed port (the first ingress port in the forwarding path).

The process 700 then generates (at 720) the forwarding path for the path failure packet by reversing the ingress and egress ports from the HFEs own ports to the first HFE of the data packet path. That is, the original path is truncated, with any subsequent HFEs in the original data packet forwarding path dropped off. This path is then reversed, with the failed port out of which the data packet could not be sent used as the initial ingress port. The last egress port in the forwarding path is the initial ingress port to which the source network endpoint sent the data packet.

It should be noted that the use of the egress ports from the original data packet as the ingress ports for the path failure packet does not guarantee that the path failure packets will always arrive at these ingress ports. For example, if multi-chassis link aggregation (MLAG) is used, then the physical ports at which the path failure packet is received could be different from the specified egress port. In addition, in certain cases, the ingress port in the path failure packet path may not match with the egress port in the path of the original data packet as a result of a problem either with the forwarding operation of one of the HFEs along the path or of the topology information stored by the source endpoint of the original data packet.

Finally, the process 700 forwards (at 725) the new path failure packet out through the port at which the initial data packet was received, then ends. This packet then follows its forwarding path back to the original source network endpoint, which incorporates the path failure data into its transient network topology, and adjusts subsequent packet forwarding decisions.

In the above examples, the forwarding path for a packet specifies a single egress port for each forwarding element. To send a broadcast or multicast packet that needs to reach multiple destinations, in some embodiments the source network endpoint determines all of the destination network endpoints for the packet and sends unicast packets via different paths to each destination. However, in some embodiments, the network endpoint relies on some or all of the HFEs to make copies of the packet according to the forwarding path instructions. Rather than providing a single egress port identifier, some embodiments use a bitmap to indicate through which egress ports a HFE sends a packet. The ports are mapped in a specific order known to both the network endpoints and the HFE, and the HFE sends a copy of the packet through each port identified with a 1 in the bitmap (or a 0, in other embodiments). Thus, a unicast packet would only specify a single port, but for at least one HFE, a multicast packet would specify multiple ports in the bitmap. This approach has the advantage of sending fewer packets from the source network endpoint to its first-hop HFE, thereby creating less of a backup in that HFE.

In the above description, the data packet headers generated by the source endpoint only include forwarding instructions (i.e., ingress and egress ports, possibly priority values). In addition to these forwarding instructions, the HFEs of some embodiments are configured to parse and execute additional types of instructions. In some embodiments, an HFE is configured at the time that the network forwarding IC is bootstrapped to recognize a set of action identifiers and execute corresponding actions (though some such embodiments also allow changes to this configuration during runtime). These actions can involve, in various embodiments, reading state values and embedding the state values in the packet header, generating and sending a new packet, etc.

Figure 8:
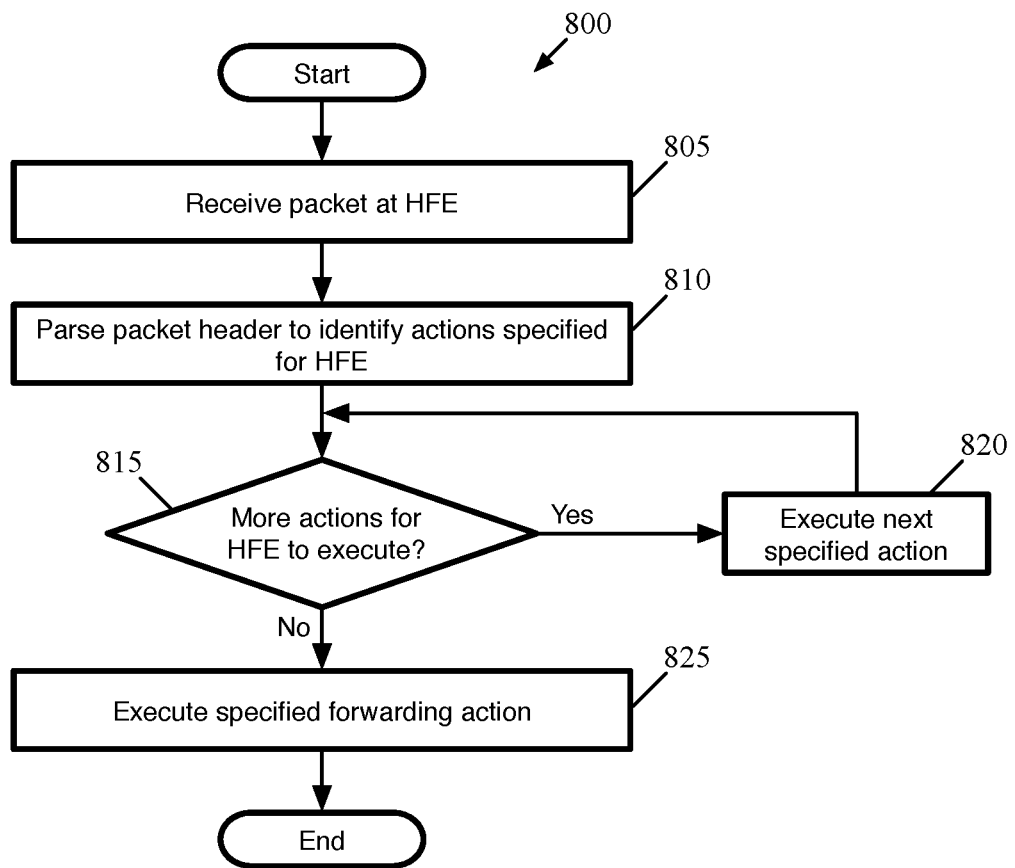
FIG. 8 conceptually illustrates a process of some embodiments for parsing a packet header and executing instructions specified in the packet header.

FIG. 8 conceptually illustrates a process 800 of some embodiments for parsing a packet header and executing instructions specified in the packet header. In some embodiments, the process 800 (or a similar process) is performed by an HFE for each packet received by the HFE. The process 800 will be described in part by reference to FIGS. 9 and 10, which illustrate two different packet header structures of some embodiments.

As shown, the process 800 begins by receiving (at 805) a packet at an HFE. The packet may be a data packet from a source network endpoint to a destination network endpoint (e.g., generated by an application on a first machine and directed to a second machine), or could be a packet specifically for the purpose of causing a particular HFE or set of HFEs to perform certain actions (e.g., a query packet to discover certain HFE state). Irrespective of the type of packet, the packet includes a packet header constructed by the network endpoint to be read by the HFEs along the path of the packet.

Upon receipt of the packet, the process 800 parses (at 810) the packet header to identify actions specified for that HFE. In some embodiments, a packet header includes sets of actions specified for some or all of the forwarding elements along the path of the packet. Each action includes an action identifier and a set of zero or more arguments for the actions (e.g., ports through which to send a packet, queues for which to read the queue state, etc.). Each action corresponds to a forwarding element identifier indicating that a particular forwarding element is configured to perform that action. Some embodiments perform multiple parallel ternary lookups on the instructions in the packet header and conditionally execute the instructions when the HFE identifier matches. In addition, some embodiments allow global instructions (i.e., instructions to be executed for each HFE) by masking the HFE identifier in these ternary lookups.

Figure 9:
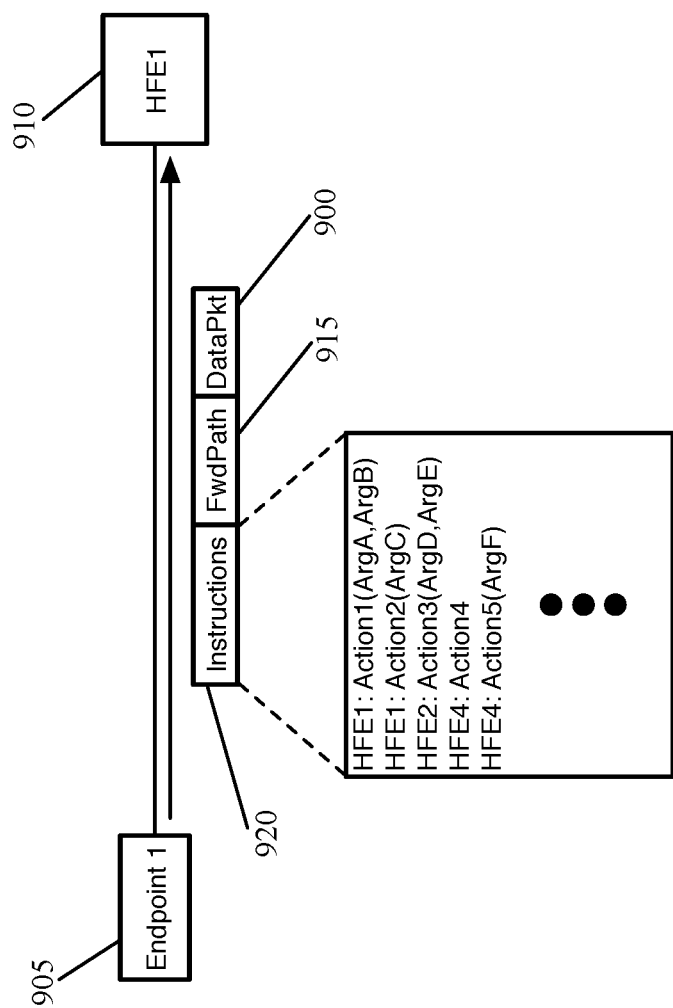
FIGS. 9 and 10 conceptually illustrate two different constructions for the packet headers of some embodiments.
Figure 10:
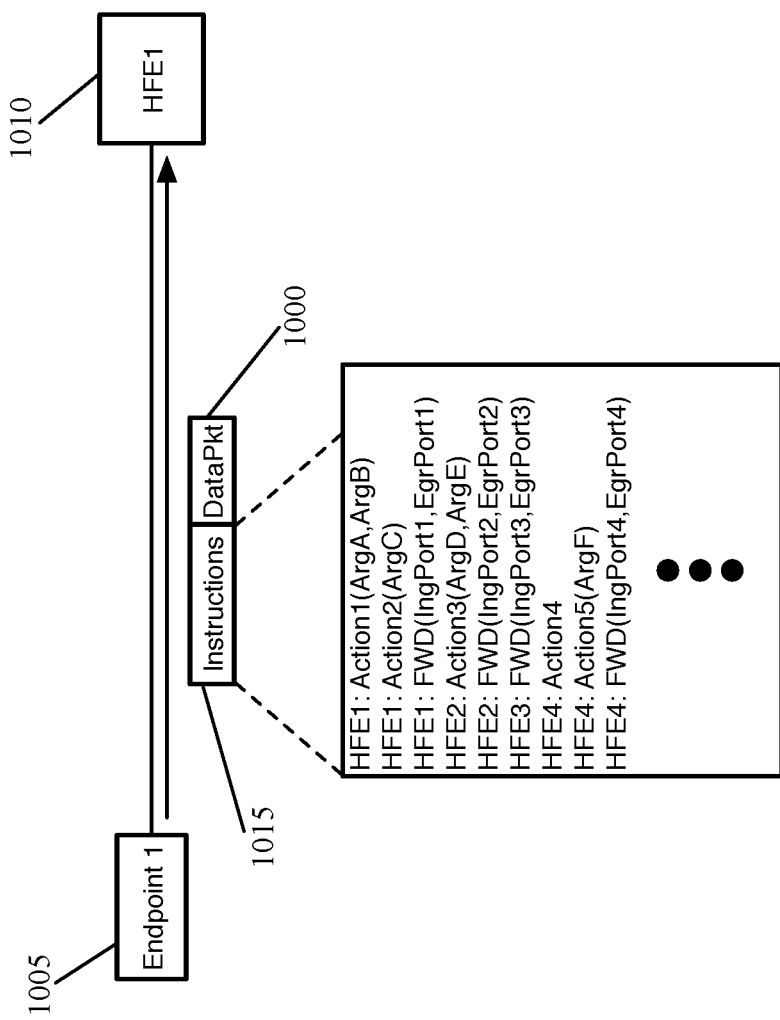

FIGS. 9 and 10 conceptually illustrate two different constructions for the packet headers of some embodiments. In FIG. 9, the forwarding path instructions are separate from the other actions, while in FIG. 10 the forwarding instructions are included in the list of actions.

FIG. 9 illustrates a data packet 900 sent by a network endpoint 905 to a first HFE 910 (the other HFEs in the path of the data packet are not shown). The network endpoint 905 generates and appends to the data packet 900 packet headers including a forwarding path header 915 and an instruction set 920. The forwarding path header 915 is formatted similarly to the forwarding headers shown in FIGS. 5 and 6, with a sequence of ingress and egress ports (with the ingress ports optionally wildcarded for the HFEs to fill in) and a counter that indicates which ingress/egress port pair the next HFE will use.

The set of instructions 920, as shown, includes various actions for each of the HFEs in the path. In some embodiments, these instructions are included using an HFE identifier paired with an action identifier and any arguments required for the action. For instance, two actions are listed for the first HFE 910, one action for the second HFE in the path, no actions for the third HFE in the path, two actions for the fourth HFE in the path, etc. The arguments can specify a particular port or queue of an HFE (e.g., to read a value from), a particular value to store at the HFE, etc., depending on the action. Each of the HFEs along the path identifies their own actions based on the HFE identifiers and converts the action identifiers to specific actions to execute. As mentioned, in some embodiments, the HFEs are configured at bootstrapping to recognize a specific set of action identifiers and convert those to actions that the HFEs execute.

FIG. 10 illustrates a data packet 1000 sent by a network endpoint 1005 to a first HFE 1010 (the other HFEs in the path of the data packet are not shown). The network endpoint 1010 generates and appends to the data packet 1000 a packet header that includes an instruction set 1015. In this case, the packet headers do not include a separate forwarding path header, as this information is included in the instruction set 1015. The set of instructions 1015 is the same as the set of instructions 920, except that each HFE in the path also includes a forwarding action with ingress and egress ports as arguments. In general, the forwarding action will be the last instruction in the set for a particular HFE, so that other actions are executed before the forwarding action is taken by the HFE.

In the case in which the forwarding instructions are included in the set of instructions and not in a separate forwarding path header, the HFEs will nevertheless need to generate path failure packets when the egress port is not operational. In some embodiments, the HFE generates a path failure packet by identifying the forwarding action for each previous HFE (so long as the action instructions are arranged in order of the HFEs in the path) and extracting the ingress and egress ports for each of the previous HFEs in the path. The HFE with the failed port then generates a path failure packet header similar to that described above and shown in FIG. 6. In addition to removing the payload, some embodiments also remove the instruction set packet header (in both the case where the instruction set is separate from the forwarding path and where the instruction set includes the forwarding path) so that the HFEs will not execute any of the actions on the packet's return to the original source network endpoint.

Returning to FIG. 8, the process 800 next determines (at 815) whether there are any (non-forwarding) actions for the HFE to execute. If additional actions remain, the process executes (at 820) the next specified action and returns to 815, until all of the (non-forwarding) actions have been executed. As shown in FIGS. 9 and 10, the actions are listed sequentially for each HFE in some embodiments. However, in some such embodiments, the HFEs can be configured to reorder the instructions in certain cases (e.g., to update a state value prior to reading the state value).

Once all of the other actions have been executed, the process 800 executes (at 825 the specified forwarding action for the packet. As noted, this action may be either included with the rest of the actions or specified in a forwarding path in different embodiments. In some embodiments, the forwarding action can also include replicating a packet to multiple ports or dropping a packet (e.g., if the packet was sent by the network endpoint to modify a state value of an HFE but does not carry a data packet for another endpoint).

These actions can vary in complexity in different embodiments. For example, the actions could include reading forwarding element states (e.g., queue state, port status, timestamp, etc.) and/or other metadata and writing these state values into the packet header. Specifically, an action identifier might correspond to reading the amount of data in a queue and storing that value in the packet header, while the argument to that action would specify the particular queue to read. More complex actions could include performing congestion aware load balancing between a set of specified queues.

Figure 11:
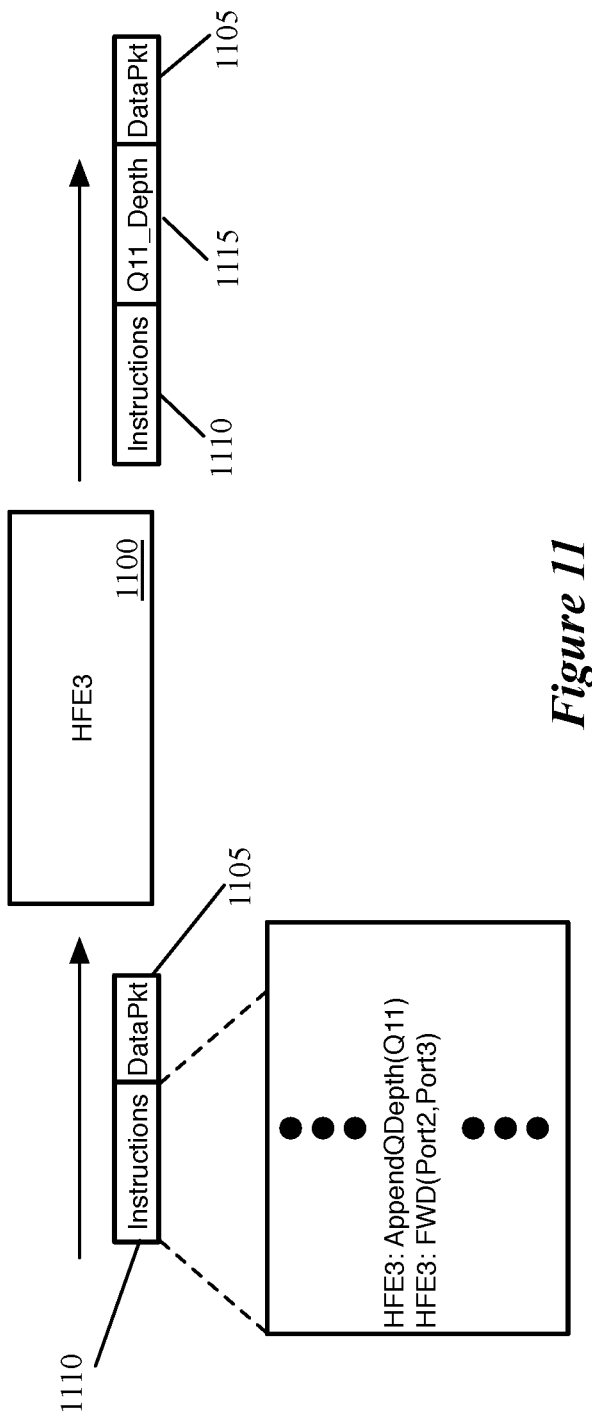
FIG. 11 conceptually illustrates an HFE executing an action to append a queue depth value to a data packet.
Figure 12:
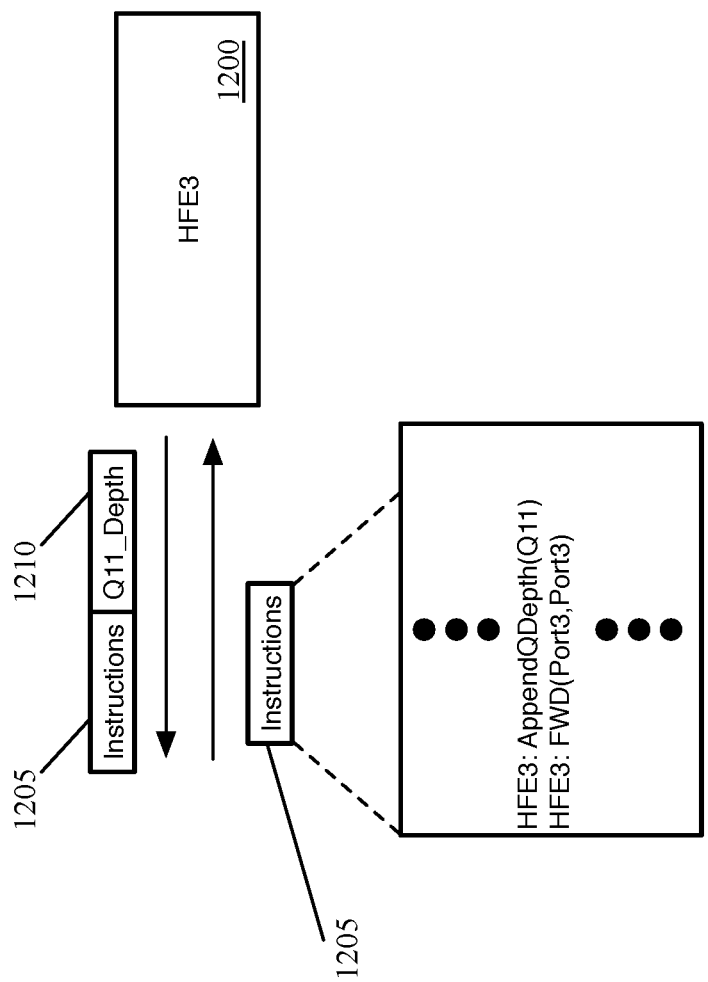
FIG. 12 illustrates an example of a query packet sent by a network endpoint specifically to determine a particular state value of an HFE and having that state returned to the network endpoint.

FIGS. 11 and 12 provide examples of HFEs executing instructions to append queue state information to different types of packets. FIG. 11 conceptually illustrates an HFE 1100 executing an action to append a queue depth value to a data packet 1105. As shown, the data packet 1105 includes a packet header with instruction set 1110. The instruction set 1110 includes two actions for the HFE 1100, including a forwarding action to output the packet via port 3. The first action specifies to append a queue depth value to the packet, with an argument indicating the particular queue for which the queue depth is to be appended (queue 11 in this case). Thus, the HFE 1100 executes this action to append the queue depth by reading the queue depth and storing the data at a particular location in the packet.

In some embodiments, the HFE includes a traffic manager with numerous queues into which packets are placed after processing but before being output. The queue depth for a particular queue indicates the extent to which that particular queue is currently filled up and can be used by the network endpoints to make forwarding path determinations or specify queue assignment for subsequent packets. In some embodiments, the network endpoints store in the network topology not only all of the HFEs and the connections between ports of the HFEs, but also a map of all of the queues for each HFE. The network endpoints can receive the queue depth (and other queue state information, such as latency—the time a packet spends in a queue before being sent out) and store this data with the topology in order to make packet forwarding decisions. In some embodiments, the network endpoints store a list of logical queue identifiers for each of the HFEs, and the HFEs store a mapping of these logical queue identifiers to their own physical queues.

In FIG. 11, the HFE 1100 parses the instruction set 1110 and identifies the action to append queue depth, then executes this action. In some embodiments, the action is specified by an action identifier (e.g., an 8-bit value, 16-bit value, etc.), which the parser or other circuitry of the HFE maps to an action or set of actions to be executed. The HFE 1100 executes this action, and outputs the data packet 1105 with both a queue depth value 1115 and the instruction set 1110 appended. In this case, the destination network endpoint for the data packet 1105 will receive the queue depth value 1115 and can use this information to make subsequent forwarding decisions.

Whereas FIG. 11 provides an example of appending additional instructions to a data packet, FIG. 12 illustrates an example of a query packet sent by a network endpoint specifically to determine a particular state value of an HFE 1200 and having that state returned to the network endpoint. As shown, the HFE 1200 receives a packet header with set of instructions 1205. The set of instructions 1205 is not appended to a data packet, but instead is generated by a source network endpoint and sent separately. In addition, the ingress and egress ports in the forwarding instructions for the HFE 1200 are the same (i.e., the HFE sends the packet out of the same port at which it is received).

The HFE 1200 parses the instruction set 1205 and identifies the action to append queue depth for queue 11, then executes this action. The HFE 1200 then outputs the packet header 1205 with a queue depth value 1210 appended. In this case, the network endpoint that generated the packet header 1205 will receive the queue depth value and can use this information to make subsequent forwarding decisions. In some embodiments, query packets that return to the source network endpoint can only be sent using a forwarding path separate from the instruction set. Otherwise, the instruction set will need to include multiple forwarding instructions for the HFEs that process the packet twice, and the HFEs will only use the first listed forwarding instruction. Other embodiments include actions to remove instructions from the instruction set after they are executed, in which case query packets can include multiple sets of forwarding instructions for the same HFE in one instruction set.

The ability of the HFEs to perform these actions and provide state data to the network endpoints enables these endpoints to use this data in determining path selection. In some embodiments, each of the network endpoints tracks the queue congestion states for each queue of all of the HFEs in the network and can redirect data packets to different paths if the queues for those data packets are too congested in a particular forwarding element. The network endpoints can also effectively execute multipathing (e.g., ECMP) for a given HFE by distributing flows across several different paths leading from that HFE. In addition, network endpoints can act as monitoring devices by requesting data (e.g., queue state or other data) from HFEs and evaluating this data once received from the HFE.

Some embodiments also enable the source network endpoint to include a packet priority value (e.g., in the forwarding path instructions). The HFEs can use this packet priority value to provide quality-of-service guarantees for certain classes/priorities of data packets. In addition, in some embodiments the HFEs can perform congestion control on a per-packet or per-flow basis by using the locally available state information (i.e., the queue depth information). This can be further improved by having each HFE embed its own information, which the subsequent HFEs can then use. HFEs can implement, e.g., fair queuing mechanisms or can actively drop packets to reduce downstream congestion in different embodiments.

Figure 13:
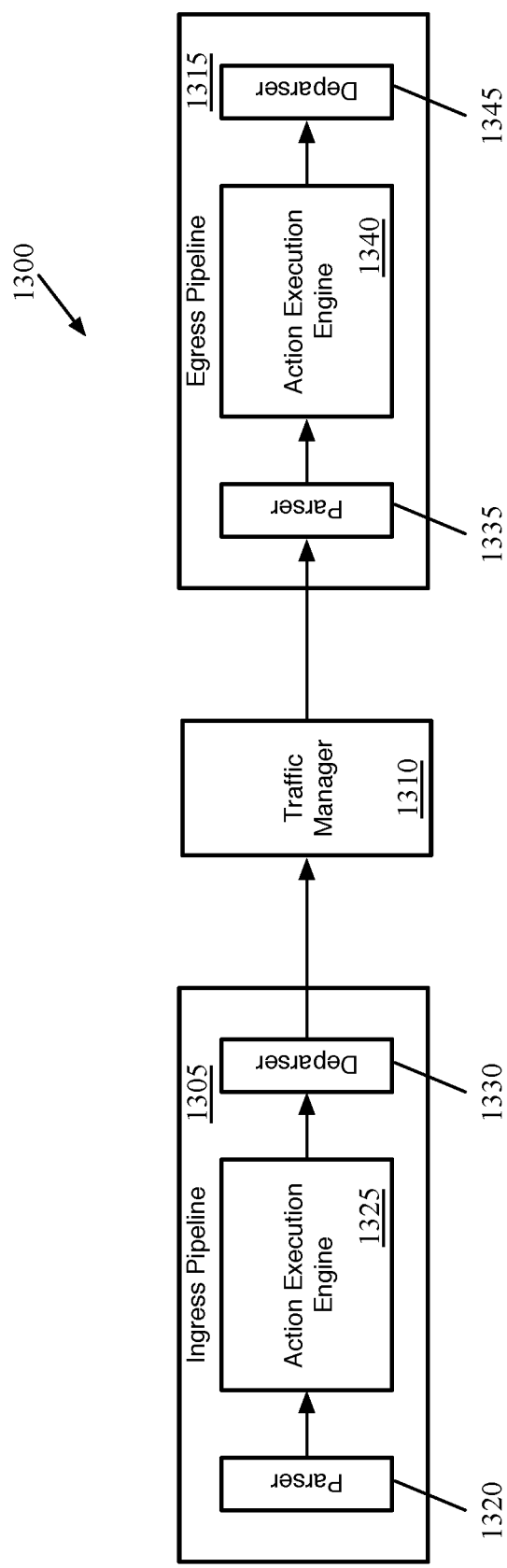
FIG. 13 conceptually illustrates the structure of the HFE data plane of some embodiments.

The HFE data plane, in order to execute these various types of actions, is structured differently in different embodiments. FIG. 13 conceptually illustrates the structure of the HFE data plane 1300 of some embodiments (e.g., the structure of the network forwarding IC that is incorporated into the HFE). As shown, the data plane 1300 includes an ingress pipeline 1305, a traffic management unit (referred to as a traffic manager 1310, and an egress pipeline 1315. In some embodiments, the data plane actually includes multiple such pipelines (e.g., multiple ingress pipelines and multiple egress pipelines) that correspond to different ports of the HFE. In addition, though shown as separate structures, in some embodiments the ingress pipeline(s) 1305 and egress pipeline(s) 1315 actually use the same circuitry resources of the network forwarding IC, which are configured to handle both ingress and egress pipeline packets synchronously. However, in other embodiments, the ingress pipeline(s) 1305 and egress pipeline(s) 1315 are separate circuitry.

Generally, when the data plane 1300 receives a packet at one of its ports, the packet is directed to the ingress pipeline 1305 that corresponds to that port. The ingress pipeline, as shown, includes a parser 1320, an action execution engine 1325, and a deparser 1330, the operations of which will be described in additional detail below by reference to FIG. 14. The parser 1320 of some embodiments identifies the actions for the action execution engine 1325 to perform, and provides the packet data (e.g., the packet headers, an action list, etc.) to the action execution engine 1325. The action execution engine 1325 performs the actions for the HFE, and provides the packet data to the deparser 1330, which reconstructs the packet and provides the packet to the traffic manager 1310.

The traffic manager 1310 of some embodiments stores the packet in a buffer, and enqueues the packet in a specific queue (e.g., a queue specified by the action execution engine 1325 according to the forwarding instructions). In some embodiments, the traffic manager dispatches the packet to the egress pipeline 1315 (e.g., according to a queue scheduler that schedules packets to be output from queues based on priority and/or other factors). The egress pipeline 1315 also includes a parser 1335, action execution engine 1340, and deparser 1345 (as noted, these may use the same resources as the corresponding ingress pipeline structures). Depending on the nature of the network (e.g., whether the HFEs only perform forwarding or also perform various additional actions), in some embodiments the HFE does not include an egress pipeline or bypasses the egress pipeline for some or all packets. For example, if the only action the HFE is expected to perform is forwarding, then the ingress pipeline 1305 translates the forwarding action into a specific traffic queue, and the packet can be output directly from that queue of the traffic manager 1310. However, certain actions, such as appending the queue state, are more easily performed by the egress pipeline 1315.

Figure 14:
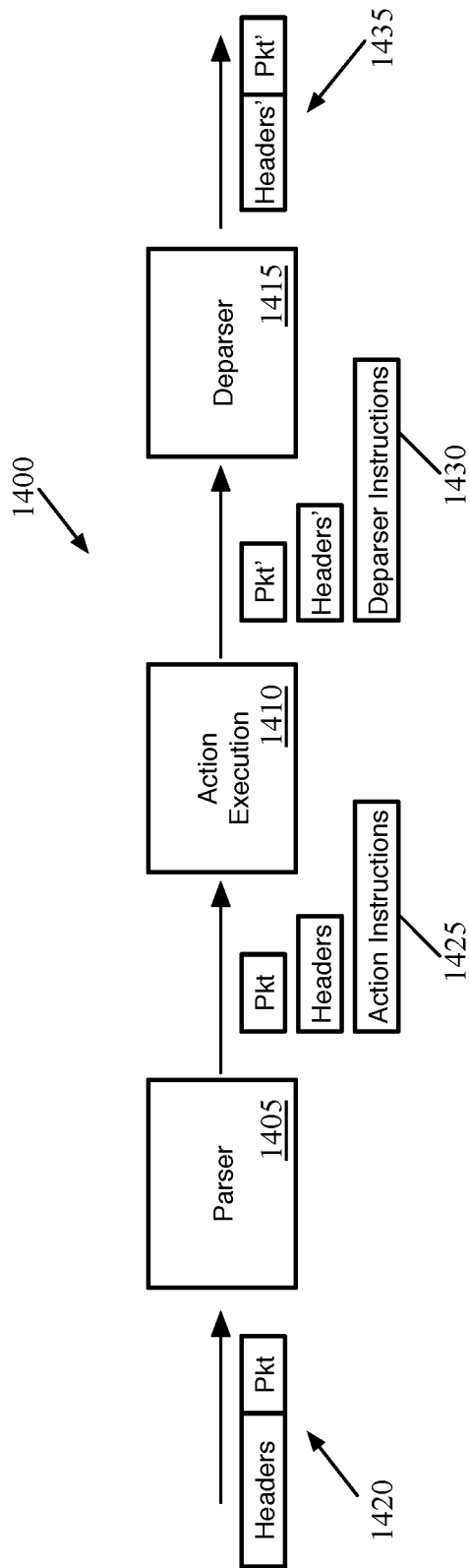
FIG. 14 conceptually illustrates additional detail about the packet processing operations of a packet processing pipeline of some embodiments.

As mentioned, FIG. 14 conceptually illustrates additional detail about the packet processing operations of a packet processing pipeline 1400 of some embodiments (e.g., the ingress pipeline 1305 or egress pipeline 1315). As shown, the pipeline 1400 includes a parser 1405 (e.g., data plane circuitry for performing parser operations), an action execution engine 1410 (e.g., data plane circuitry for executing specified actions), and a deparser 1415 (e.g., data plane circuitry for performing deparser operations), as in the ingress and egress pipelines described above.

The parser 1405, as shown, receives a packet 1420 (e.g., from a port of the HFE, from the traffic manager) as a formatted collection of bits. The packet 1420 includes headers (e.g., forwarding instructions, other action instructions, etc.) as well as the internal packet (which may include various internal L2-L4 headers, a payload, etc.). The parser 1405 parses this packet to at least identify action instructions 1425 for the action execution engine 1410 to execute. In some embodiments, the parser provides the packet data, action instructions, etc. to the action execution engine as a set of data containers, with specific containers (e.g., data transported on specific sets of wires) each having specific packet header fields, actions, etc. In addition, in some embodiments some of the packet data (e.g., the payload) is not sent to the action execution engine 1410, but instead is sent directly to the deparser 1415, bypassing the action execution engine.

In some embodiments, each of the action instructions 1425 is an action identifier (e.g., an 8-bit value, 12-bit value, etc.) that commands the action execution engine 1410 to take a particular action and may also include one or more arguments. As described above, the parser 1405 determines these actions and arguments by parsing the packet headers and provides to the action execution engine 1410 the actions for the pipeline 1400 to perform. In some embodiments, the action identifiers in the received packet specify whether they are to be performed by the ingress pipeline or the egress pipeline (e.g., by allocating one of the bits of the identifier to be an ingress/egress bit), while in other embodiments the parser is responsible for determining whether each action is an ingress pipeline action or an egress pipeline action.

In other embodiments, some or all of the action instructions 1425 are sections of code (e.g., P4 program code) carried in the packet that instructs the HFE to perform the requisite action. In some such embodiments, the parser 1405 extracts and reads the code and converts the code into an action identifier that is passed to the action execution engine 1410. In other such embodiments, the parser passes the code itself to the action execution engine 1410, which runs the code in order to perform the specified action.

The action instructions 1425 are provided to the action execution engine 1410 in a particular order in some embodiments, and the action execution engine performs the actions in this order. In some embodiments, this is the order in which the actions are listed in the packet header, while in other embodiments the parser 1405 may modify the order of the actions for the pipeline.

The action execution engine 1410 executes these actions in the specified order, which may involve modifying the packet data. In some embodiments, the action execution engine 1410 includes multiple stages, and each stage performs one of the specified actions. Other embodiments perform some or all of the actions in parallel. To execute an action, the action execution engine 1410 of some embodiments reads the action identifier, which corresponds to manipulating a set of inputs in a preconfigured manner. These inputs can be data by the HFE (e.g., a queue state), arguments of the action identifier (e.g., a queue identifier), or the packet header values themselves (in the case of packet header manipulation).

In some embodiments, the action identifiers 1425 are provided to the action execution engine in packet header vector (PHV) data containers, which also store the packet headers (and, in some cases, the packet data as well). These data in these PHV data containers is passed between stages of the action execution engine 1410, and can be modified by the actions (e.g., to store state data for output with the packet, to write an ingress port into the forwarding path, etc.). To execute an action, some embodiments do not use any match logic, and instead read the appropriate action identifier from the PHV directly to specify the action to execute. In other embodiments, the action execution stage structure requires that the action identifier be output from a match table. In some such embodiments, the match table logic is configured at compile time to simply match the action identifier stored in the PHV and output the same action identifier for execution.

As shown, the action execution engine 1410 outputs the packet data and packet headers (which may be modified by the various actions) to the deparser 1415, along with deparser instructions 1430. These deparser instructions may specify data to drop from the packet headers, which data to use in reconstructing the packet, as well as information regarding the output of the packet (e.g., the queue to which the packet will be sent, etc.). The deparser 1415 reconstructs the modified packet 1435 and provides this to the traffic manager (or the output port, if the pipeline 1400 is the egress pipeline).

One potential issue with providing the above-described level of functionality to the network endpoints is that a compromised network endpoint has a lot of power over the operation of the network. In a traditional network, the forwarding elements have their own access control list (ACL) rules that can check whether packets should be discarded. However, a forwarding element that only performs actions specified by the network endpoints, rather than performing match operations, will not have such ACL rules.

If the network endpoint is completely trusted (e.g., in the case of a secure hypervisor networking stack), then this is not an issue. However, in some embodiments, to ensure that malicious endpoints cannot compromise a network, the forwarding elements verify the ACL rules using a shared secret between the network controllers and the forwarding elements (or separate shared secrets between the controllers and each of the forwarding elements).

Specifically, in some embodiments, the source network endpoint is responsible for evaluating each packet against a set of ACL rules that the network endpoint receives from the set of network controllers. The network controllers of some embodiments provide each of the network endpoints with the set of ACL rules (which may be different for different network endpoints) as well as a precomputed digest for each of the ACL rules. The precomputed digest is generated by the network controller for each ACL controller using a secret key (e.g., with a hash function) to which the network endpoints do not have access.

Figure 15:
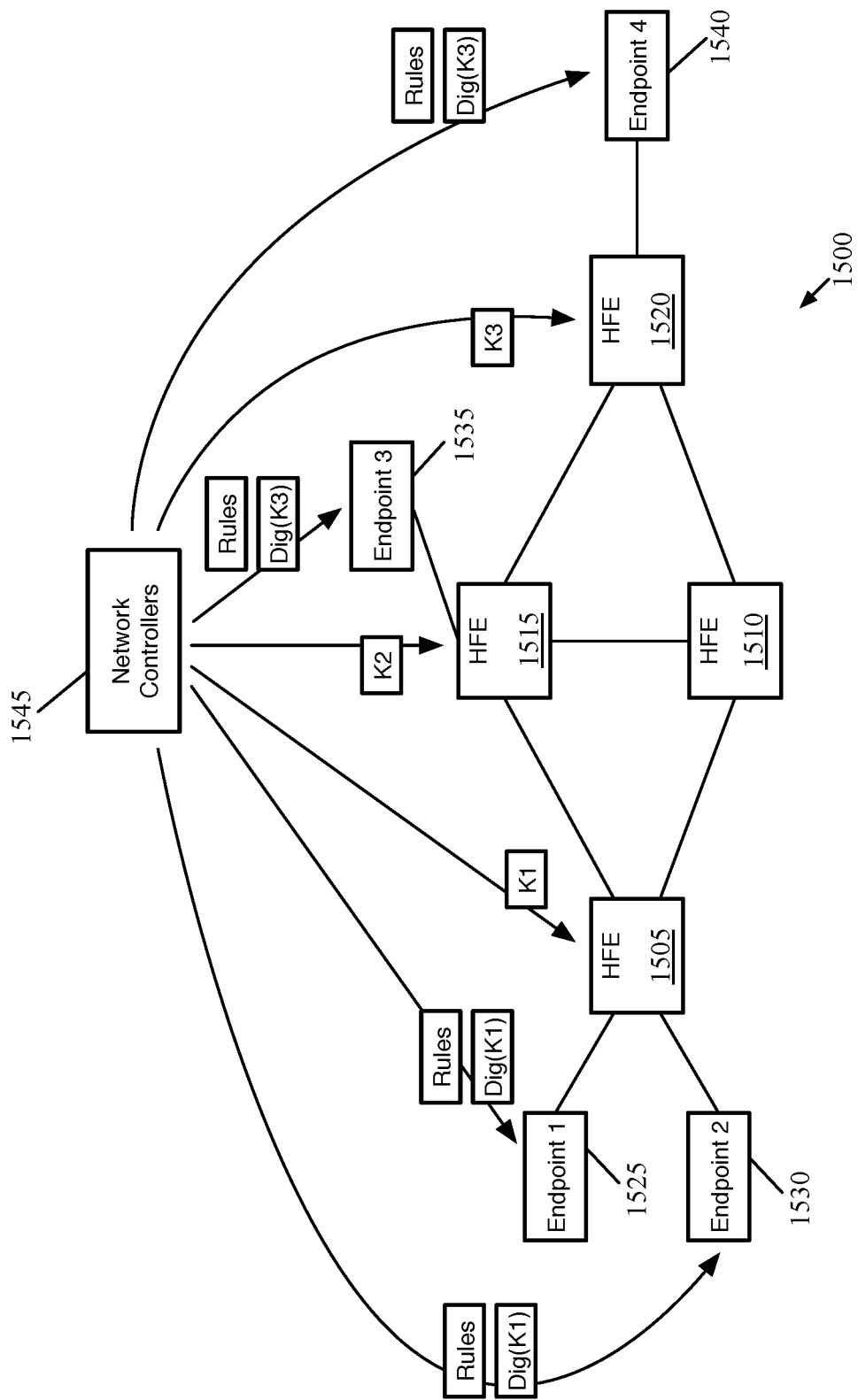
FIG. 15 conceptually illustrates an example of a network with a network controller that distributes ACL rules to the network endpoints and secret keys to the hardware forwarding elements.

FIG. 15 conceptually illustrates an example of a network 1500 with a set of network controllers 1545 that distributes ACL rules to the network endpoints and secret keys to the hardware forwarding elements. As shown, the network 1500 includes four HFEs 1505-1520, four network endpoints 1525-1540, and a set of network controllers 1545. It should be understood that a typical network will include many more HFEs and network endpoints than are shown in the simplified network 1500. The network 1500 is set up such that the first HFE 1505 is the first-hop HFE for two of the network endpoints 1525 and 1530 (i.e., these network endpoints connect directly to ports of the HFE 1505), the third HFE 1515 is the first-hop HFE for a third network endpoint 1535, and the fourth HFE 1540 is the first-hop HFE for a fourth network endpoint 1540. The second HFE 1510 is purely internal to the network and does not receive packets directly from any of the network endpoints.

The network controllers 1545 represent a set of network controllers that provide the stationary network topology to the network endpoints and provide initial configuration data to the HFEs (e.g., the mapping of action identifiers to actions). The network controllers 1545 are shown in this figure as providing data to the HFEs 1505-1520 and the network endpoints 1525-1540 directly, though in some embodiments this communication is sent through the network 1500. That is, the network controllers can send configuration data (and receive, e.g., bootstrapping packets) in a manner similar to the network endpoints.

As shown in the figure, the network controllers 1545 provide secret keys to each of the three HFEs 1505, 1515, and 1520 that are first-hop HFEs for any of the network endpoints. These first-hop HFEs are responsible in some embodiments for using the secret keys to verify ACL rules appended to packets sent by their respective directly-connected network endpoints. In this example, each of the HFEs receives a separate secret key: K1 for the first HFE 1505, K2 for the third HFE 1515, and K3 for the fourth HFE 1520.

The secret keys are not provided to the network endpoints 1525-1540. As such, the network endpoints cannot compute digests for an ACL rule that is not sent from the network controller, preventing a compromised network endpoint from forging ACL rules. Instead, the network controllers provide the ACL rules that the network endpoints are to use to evaluate packets before sending them to the HFE network 1500 as well as digests for each ACL rule that are precomputed by the network controllers using the appropriate secret key. Thus, as shown, the network controller 1545 provide ACL rules and digests computed with the key K1 of the first HFE 1505 to both of the first two network endpoints 1525 and 1530. Similarly, the third network endpoint 1535 receives the ACL rules as well as digests for these rules computed with the key K2 of the third HFE 1515, and the fourth network endpoint 1540 receives the ACL rules as well as digests for these rules computed with the key K3 of the fourth HFE 1520. In some embodiments, all of the network endpoints receive the same set of ACL rules while in other embodiments different ACL rules are provided to different network endpoints. In addition, while in this example, each HFE uses a different secret key, some embodiments use a single secret key for all of the HFEs in a network.

When sending a packet, if operating properly, the source network endpoint for the packet evaluates the packet against its set of ACL rules received from the HFE to determine whether to allow or block/drop the packet. In some embodiments, the ACL rules specify whether to allow or deny packets based on combinations of the source and/or destination addresses of the packet (e.g., MAC addresses, IP addresses, etc.) as well as, potentially, other packet header values (e.g., transport layer port numbers). When the matching ACL rule (noting that in some embodiments, the ACL rules do not have priorities, but are flattened by the network controller to avoid overlapping rules) allows the packet to be sent through the network, the source network endpoint appends this matching ACL rule to the packet along with the precomputed digest for that rule that was received from the network controllers.

If the source network endpoint is completely trusted and there is no way for either the network endpoints to become compromised by malicious actors or spoofed, then the HFEs do not need to verify whether the source network endpoint has applied the rules correctly. However, when this is not the case, the HFEs of some embodiments are configured to prevent malicious or compromised network endpoints from sending packets to the network.

Upon receiving a packet, the HFE of some embodiments verifies both (i) that the ACL rule matches the digest and (ii) that the ACL rule is a correct ACL rule for the packet. If the ACL rule passes both of these checks, then the HFE continues processing the packet (e.g., forwarding the packet, performing any additional actions specified in the packet header). However, if the ACL rule fails either of the checks, then the HFE drops the packet in some embodiments, on the premise that the packet is either sent from a compromised network endpoint or an invalid network endpoint. Similarly, if the packet does not have an ACL rule attached, the forwarding element also drops the packet in some embodiments.

Figure 16:
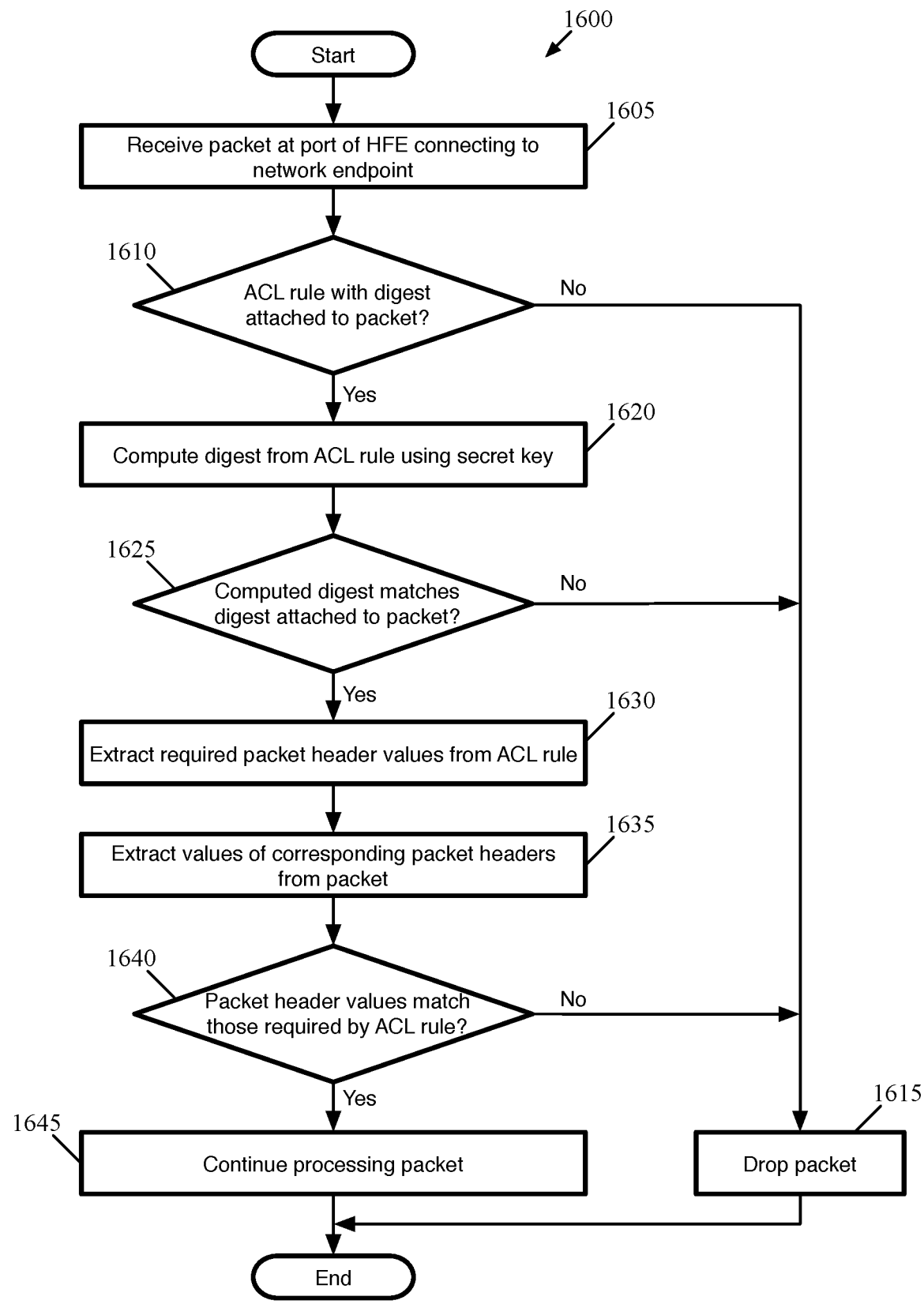
FIG. 16 conceptually illustrates a process of some embodiments for verifying an ACL rule appended to a packet.

FIG. 16 conceptually illustrates a process 1600 of some embodiments for verifying an ACL rule appended to a packet. The process 1600 is performed by an HFE that receives a packet and is configured to expect an ACL rule with a digest appended to the packet. In some embodiments, the process 1600 is performed prior to the HFE executing any other actions specified in the packet header (e.g., at the start of the ingress pipeline, after parsing the packet). The process 1600 will be described in part by reference to FIGS. 17 and 18, which illustrate an HFE performing different aspects of the ACL rule verification.

As shown, the process 1600 begins by receiving (at 1605) a packet at a port of the HFE connecting to a network endpoint. In some embodiments, the HFE is a first-hop HFE for one or more network endpoints and is configured to perform the ACL verification process only on packets received through its ports that connect to those network endpoints. In other embodiments, the HFE performs this process on all packets that it receives (with potentially all of the HFEs that a packet traverses verifying the packet's ACL rule).

Next, the process 1600 determines (at 1610) whether an ACL rule with a digest is attached the packet. In some embodiments, the HFE also parses the packet prior to performing any of the operations from 1610 onwards. In some such embodiments, part of the parser operations includes determining whether an ACL rule and a digest are present at the location in the packet where this data is expected. When the packet does not include an ACL rule, the process drops (at 1615) the packet, then ends.

Assuming the packet does have an ACL rule and digest attached, the process 1600 computes (at 1620) a new digest from the ACL rule using a secret key. As described above, this secret key is shared between the HFE and the network controller in some embodiments. In some embodiments, this digest computation involves applying a cryptographic hash function to the ACL rule using the secret key.

The process 1600 then determines (at 1625) whether the newly computed digest matches the precomputed digest attached to the packet. If the digests do not match, this indicates that the source network endpoint did not receive the ACL rule from the network controller (e.g., because the network endpoint is not a verified endpoint for the network). As such, if the digests do not match, the process drops (at 1615) the packet, then ends.

Figure 17:
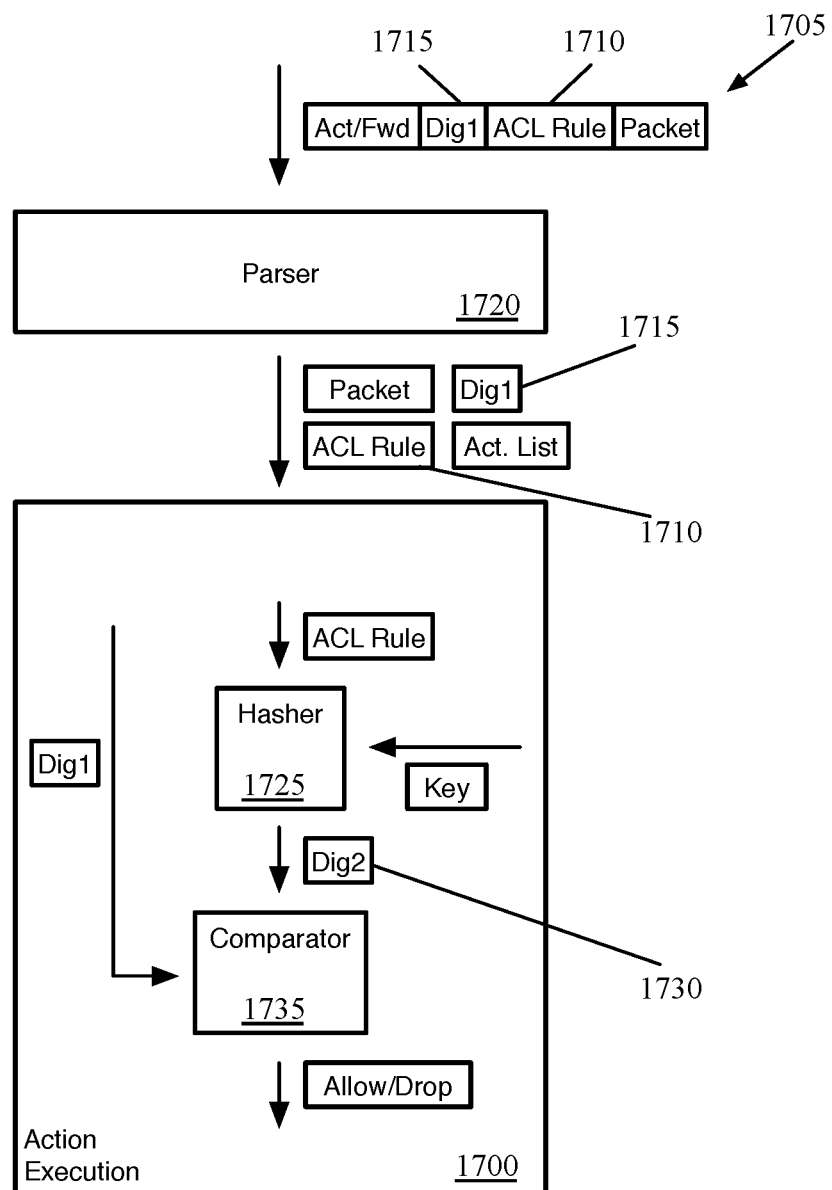
FIG. 17 conceptually illustrates the action execution engine of an HFE performing ACL digest verification.

FIG. 17 conceptually illustrates the action execution engine 1700 of an HFE performing this ACL digest verification. As shown, the parser of the HFE receives a packet 1705 that includes a packet header with action and/or forwarding instructions, an ACL rule 1710, and a digest 1715. The parser 1720 of the HFE parses the packet 1705 into its various fields, including the ACL rule 1710 and digest 1715 (as well as a list of actions). Within the action execution engine circuitry 1700, a hasher 1725 (e.g., a set of circuitry/logic configured to perform a secure hash algorithm) receives the ACL rule and the secret key (securely stored at the HFE, in some embodiments), and computes a new digest 1730. A comparator 1735 (e.g., a set of circuitry/logic configured to compare two values) compares the received digest 1715 and the newly computed digest 1730 and outputs an allow/drop decision (e.g., as a single bit).

If the computed digest matches the digest attached to the packet, the process 1600 next verifies that the ACL rule is a correct ACL rule for the packet. The process extracts (at 1630) the required packet header values from the ACL rule and extracts (at 1635) the values of the corresponding packet headers from the packet. In some embodiments, the parser will have previously parsed the packet into these constituent values and included the values in the packet data sent to the action execution engine of the HFE. In addition, some embodiments (either in the parser or in the action execution engine) determine the type of values used in the ACL rule (e.g., source and/or destination IP addresses, source and/or destination transport layer port numbers, source and/or destination MAC addresses, protocol values, etc.) and determine the packet header field values that correspond to these ACL rule values. Some embodiments require that the ACL rules be structured in a particular manner so that the parser or other components of the HFE can identify the required packet header values or ranges of values.

The process 1600 then determines (at 1640) whether the packet header values match those values required by the ACL rule. This operation does not require the use of match table logic in some embodiments, as the HFE simply needs to compare values from the ACL rule to the corresponding values from the packet header rather than using stored match table entries. In some embodiments, the packet header values are compared to a range of values specified by the ACL rule (e.g., a range of IP addresses specified by a CIDR prefix). In different embodiments, this comparison may be done by comparing the bit values of a portion of the field (e.g., for a range of continuous IP addresses or port numbers), or by multiple individual comparisons to various alternative values (e.g., for a set of MAC addresses). If the packet header values do not match those required by the ACL rule, then this indicates that the source network endpoint appended an invalid ACL rule to the packet (e.g., because the source endpoint is compromised). As such, if the header values of the packet do not match those required by the ACL rule, then the process 1600 drops (at 1615) the packet, then ends. Otherwise, the process continues (at 1645) processing the packet (e.g., performing other actions and/or forwarding the packet).

In order to prevent a compromised network endpoint from skipping over a higher priority rule denying a packet and using a lower priority rule that allows the packet (which would seem to the forwarding element as a valid and correct ACL rule), the network controllers of some embodiments flatten out the ACL rule set (ensuring there is no overlap in the rule space) before providing the ACL rules and digests to the network endpoints. In this case, no priorities are required for the rules. In other embodiments, the ACL rule set may be overlapping, but effectively acts as a whitelist. That is, the network controller provides rules (which may overlap) for all allowable packets, and a single lower-priority rule denying all other packets. In this case, the network controller analyzes the rules to remove rules that would allow packets with higher-priority rules denying those packets (or to modify the rules, if the rules allow a range of addresses or ports and only a portion of that range should be denied). Another option employed by some other embodiments is that rather than the source endpoint appending the specific rule that allows the packet, the source endpoint is required to append the entire rule set and the digest provided by the network controller for the entire rule set. This approach has the downside of being expensive in terms of packet header size as well as being a larger hash computation for the HFE.

Figure 18:
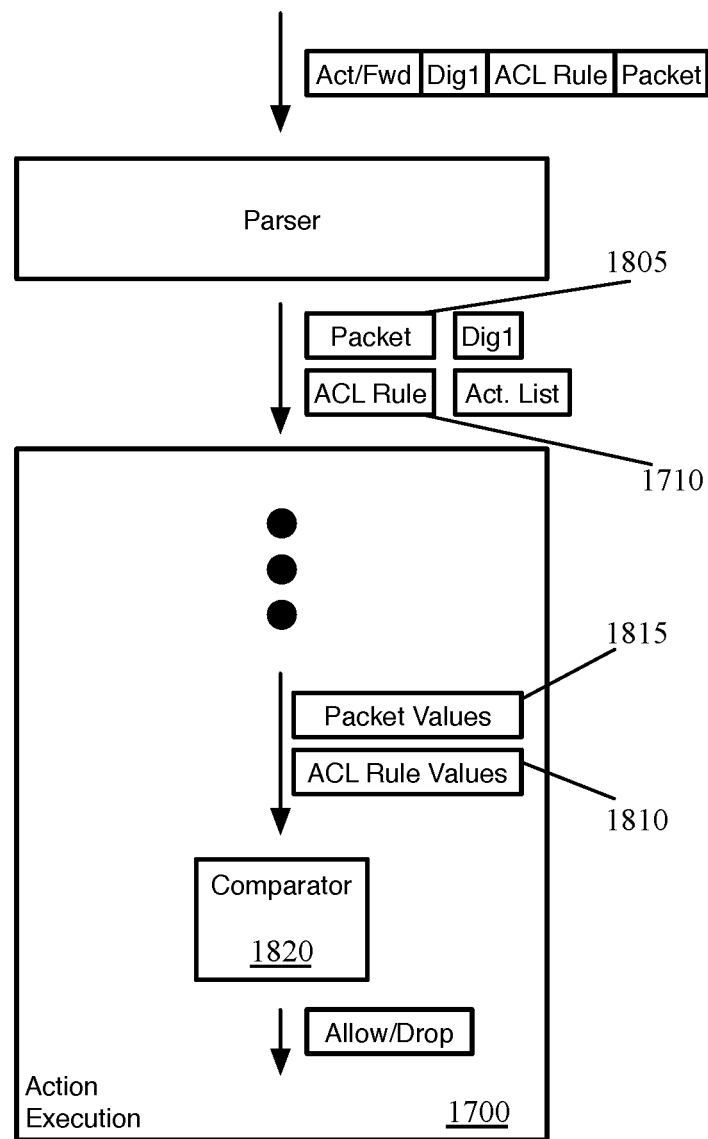
FIG. 18 conceptually illustrates the action execution engine performing ACL rule verification for the packet.

FIG. 18 conceptually illustrates the action execution engine 1700 performing ACL rule verification for the packet 1705. As described by reference to FIG. 17, the parser 1720 provides the action execution engine 1700 with packet data 1805 and the ACL rule 1710, among other data. The ACL rule is structured such that the action execution engine 1700 (or the parser 1720, in other embodiments) can isolate the value or values that a packet header must match in order to pass the ACL rule. These ACL rule values 1810 are provided to a comparator 1820 in the action execution engine 1700 along with corresponding packet header values 1815. In some embodiments, either the parser 1720 or the action execution engine 1700 also identifies the type of values (i.e., the packet header fields) that the ACL rules is based on, so that the comparator 1820 uses the correct packet header field value inputs 1815. The comparator 1820 compares the ACL rule values 1810 and the corresponding packet header field values 1815 and outputs an allow/drop decision (e.g., as a single bit).

Figure 19:
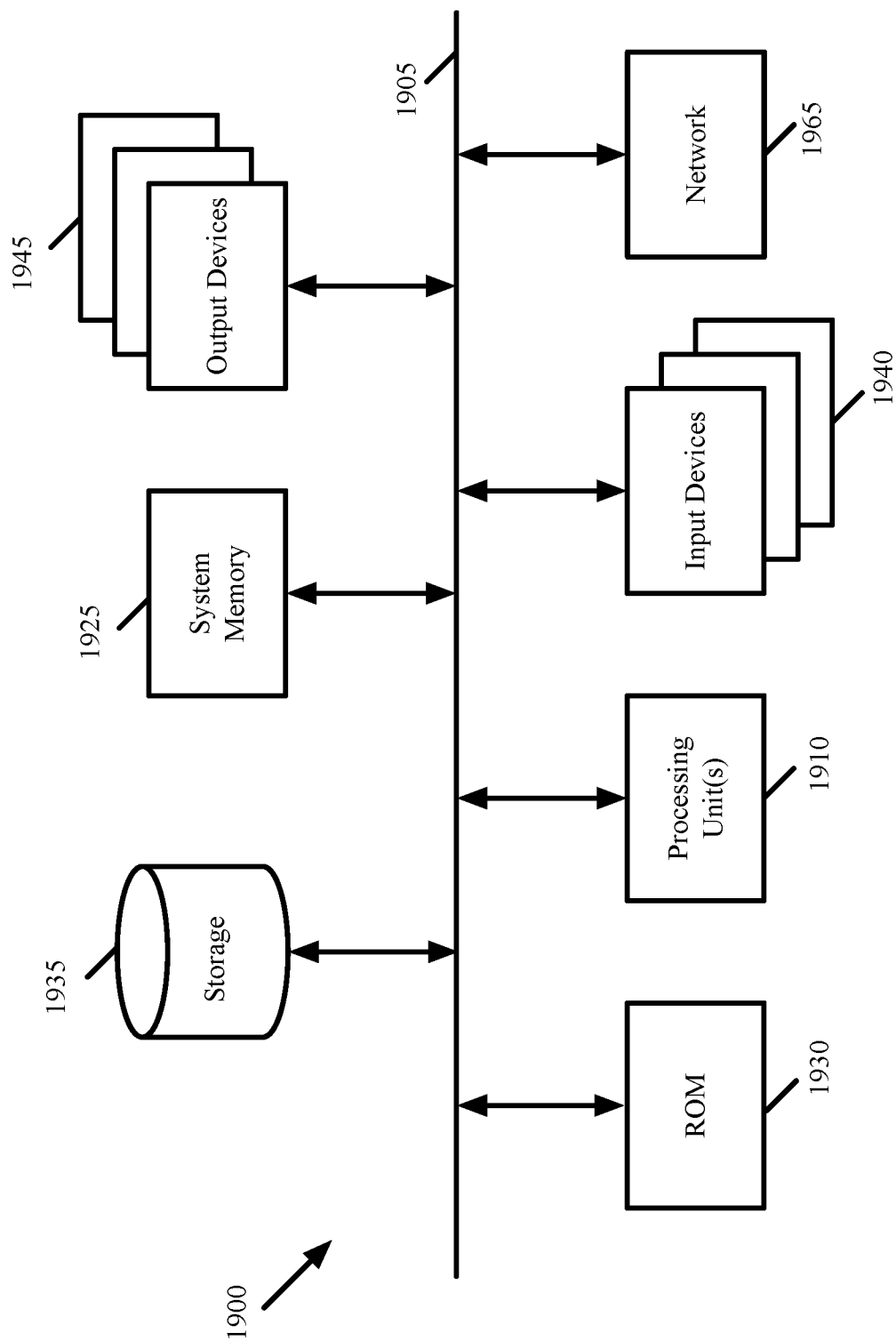
FIG. 19 conceptually illustrates an electronic system with which some embodiments of the invention are implemented.

FIG. 19 conceptually illustrates an electronic system 1900 with which some embodiments of the invention are implemented. The electronic system 1900 can be used to execute any of the control, virtualization, or operating system applications described above. The electronic system 1900 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1900 includes a bus 1905, processing unit(s) 1910, a system memory 1925, a read-only memory 1930, a permanent storage device 1935, input devices 1940, and output devices 1945.

The bus 1905 collectively represents all system, peripheral, and chipset buses that communicatively connect the numerous internal devices of the electronic system 1900. For instance, the bus 1905 communicatively connects the processing unit(s) 1910 with the read-only memory 1930, the system memory 1925, and the permanent storage device 1935.

From these various memory units, the processing unit(s) 1910 retrieves instructions to execute and data to process in order to execute the processes of the invention. The processing unit(s) may be a single processor or a multi-core processor in different embodiments.

The read-only-memory (ROM) 1930 stores static data and instructions that are needed by the processing unit(s) 1910 and other modules of the electronic system. The permanent storage device 1935, on the other hand, is a read-and-write memory device. This device is a non-volatile memory unit that stores instructions and data even when the electronic system 1900 is off. Some embodiments of the invention use a mass-storage device (such as a magnetic or optical disk and its corresponding disk drive) as the permanent storage device 1935.

Other embodiments use a removable storage device (such as a floppy disk, flash drive, etc.) as the permanent storage device. Like the permanent storage device 1935, the system memory 1925 is a read-and-write memory device. However, unlike storage device 1935, the system memory is a volatile read-and-write memory, such a random-access memory. The system memory stores some of the instructions and data that the processor needs at runtime. In some embodiments, the invention's processes are stored in the system memory 1925, the permanent storage device 1935, and/or the read-only memory 1930. From these various memory units, the processing unit(s) 1910 retrieves instructions to execute and data to process in order to execute the processes of some embodiments.

The bus 1905 also connects to the input and output devices 1940 and 1945. The input devices enable the user to communicate information and select commands to the electronic system. The input devices 1940 include alphanumeric keyboards and pointing devices (also called "cursor control devices"). The output devices 1945 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 19, bus 1905 also couples electronic system 1900 to a network 1965 through a network adapter (not shown). In this manner, the computer can be a part of a network of computers (such as a local area network ("LAN"), a wide area network ("WAN"), or an Intranet, or a network of networks, such as the Internet. Any or all components of electronic system 1900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 4, 7, 8, and 16) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. For a forwarding element (FE) operating in a network of FEs, a method comprising:
   receiving, at a data plane of the FE, a data message with an access control list (ACL) rule and a first digest for the ACL rule appended to the data message, the ACL rule specifying that the data message is allowed or denied to be sent to the network and the first digest comprises content;
   verifying, at the data plane, the ACL rule by computing a second digest from the ACL rule using a secret key and comparing the first digest to the second digest;
   determining, at the data plane, whether the data message matches the ACL rule by comparing values in headers of the data message to values specified in the ACL rule; and
   only forwarding the received data message if the ACL rule is verified, at the data plane, and the data message is identified as allowed in the ACL rule.

2. The method of claim 1, wherein the ACL rule and the first digest are appended to the data message by a source network endpoint for the data message.

3. The method of claim 2, wherein the source network endpoint evaluates the data message according to a plurality of ACL rules including the ACL rule.

4. The method of claim 3, wherein the ACL rule is a highest-priority ACL rule in the plurality of ACL rules that matches values in the data message headers, wherein the ACL rule specifies to allow the data message to be sent to the network.

5. The method of claim 3, wherein the plurality of ACL rules are provided by a network controller that ensures that only a single rule is provided for any possible set of packet headers.

6. The method of claim 3, wherein the plurality of ACL rules comprise a plurality of allow rules that allow packets matching any of the allow rules to be sent and a deny rule that (i) is lower-priority than the allow rules and (ii) prevents packets that do not match any of the allow rules from being sent.

7. The method of claim 2, wherein the secret key is received by the FE from a network controller that provides the ACL rule and the digest to the source network endpoint.

8. The method of claim 7, wherein the source network endpoint does not receive the secret key.

9. The method of claim 7, wherein the source network endpoint receives a precomputed digest for each of a plurality of ACL rules used to evaluate data messages.

10. The method of claim 1, wherein computing the second digest comprises applying a hash function to the ACL rule.

11. The method of claim 1, wherein the ACL rule specifies a set of one or more source addresses that are allowed for the data message, wherein determining whether the data message matches the ACL rule comprises comparing a source address of the data message to the set of one or more allowed source addresses.

12. The method of claim 1, wherein the ACL rule specifies a set of one or more destination addresses that are allowed for the data message, wherein determining whether the data message matches the ACL rule comprises comparing a destination address of the data message to the set of one or more allowed destination addresses.

13. The method of claim 1, wherein the ACL rule specifies a set of one or more port numbers that are allowed for the data message, wherein determining whether the data message matches the ACL rule comprises comparing a port number of the data message to the set of one or more allowed port numbers.

14. The method of claim 1, wherein the FE drops the data message if the first digest does not match the second digest.

15. The method of claim 1, wherein the FE drops the data message if the data message does not match the ACL rule.

16. The method of claim 1, wherein the secret key is received by the FE from a network controller, wherein the network controller provides the secret key to a plurality of the FEs in the network.

17. The method of claim 1, wherein the secret key is received by the FE from a network controller, wherein the network controller provides different secret keys to each of a plurality of the FEs in the network.

18. A hardware forwarding element (HFE) for operation in a network of forwarding elements (FEs), the HFE comprising:

a first network interface to receive a data message with an access control list (ACL) rule and a first digest for the ACL rule appended to the data message, the ACL rule specifying that the data message is allowed or denied to be sent to the network and the first digest comprises content;

a set of data plane circuits to (i) verify, in the set of data plane circuits, the ACL rule by compute a second digest from the ACL rule using a secret key and compare the first digest to the second digest, (ii) determine, in the set of data plane circuits, whether the data message matches the ACL rule by compare values in headers of the data message to values specified in the ACL rule, and (iii) in the set of data plane circuits, only allow the received data message to be forwarded through a second network interface of the HFE if the ACL rule is verified and the data message is identified as allowed in the ACL rule.

19. The HFE of claim 18, wherein the set of data plane circuits comprises a hash computer to compute the second digest from the ACL rule using the secret key.

20. The HFE of claim 18, wherein the set of data plane circuits is to drop the data message if either (i) the ACL rule is not verified or (ii) the data message does not match the ACL rule.

* * * * *